US009665258B2

(12) United States Patent
Tse et al.

(10) Patent No.: US 9,665,258 B2
(45) Date of Patent: May 30, 2017

(54) INTERACTIVE INPUT SYSTEM DISPLAYING AN E-BOOK GRAPHIC OBJECT AND METHOD OF MANIPULATING A E-BOOK GRAPHIC OBJECT

(75) Inventors: Edward Tse, Calgary (CA); Jamie Duncalf, Calgary (CA); Erik Benner, Calgary (CA); Min Xin, Calgary (CA)

(73) Assignee: SMART TECHNOLOGIES ULC, Calgary (CA)

( * ) Notice: Subject to any disclaimer, the term of this patent is extended or adjusted under 35 U.S.C. 154(b) by 277 days.

(21) Appl. No.: 13/576,887

(22) PCT Filed: Feb. 4, 2011

(86) PCT No.: PCT/CA2011/000138
§ 371 (c)(1),
(2), (4) Date: Oct. 12, 2012

(87) PCT Pub. No.: WO2011/094855
PCT Pub. Date: Aug. 11, 2011

(65) Prior Publication Data
US 2013/0021281 A1   Jan. 24, 2013

Related U.S. Application Data

(60) Provisional application No. 61/301,967, filed on Feb. 5, 2010.

(51) Int. Cl.
| | |
|---|---|
| *G06F 3/041* | (2006.01) |
| *G06F 3/048* | (2013.01) |
| *G06F 3/0484* | (2013.01) |
| *G06F 3/042* | (2006.01) |
| *G06F 3/0483* | (2013.01) |
| *G06F 3/0488* | (2013.01) |

(52) U.S. Cl.
CPC ........ *G06F 3/04845* (2013.01); *G06F 3/0425* (2013.01); *G06F 3/0483* (2013.01);
(Continued)

(58) Field of Classification Search
CPC .. G06F 3/0425; G06F 3/0483; G06F 3/04845; G06F 3/6483; G06F 1/1626;
(Continued)

(56) References Cited

U.S. PATENT DOCUMENTS

| | | | |
|---|---|---|---|
| 5,448,263 A | 9/1995 | Martin | |
| 6,141,000 A | 10/2000 | Martin | |

(Continued)

FOREIGN PATENT DOCUMENTS

| | | |
|---|---|---|
| CA | 2680559 A1 | 9/2008 |
| WO | 2005/055085 A1 | 6/2005 |
| WO | 2010/128616 A1 | 11/2010 |

OTHER PUBLICATIONS

Transmittal; International Search Report; and Written Opinion of the International Searching Authority for International Application No. PCT/CA2011/000138 with a mailing date of Apr. 21, 2011.

*Primary Examiner* — Andrew Sasinowski
*Assistant Examiner* — Kuo Woo
(74) *Attorney, Agent, or Firm* — Perkins Coie LLP

(57) ABSTRACT

An interactive input system includes a touch panel; and processing structure displaying on the touch panel at least one graphic object depicting a book having one or more page stacks. The processing structure displays each page stack of the book graphic object with a respective width that is based on a number of pages in the page stack. A method for manipulating a book object, and computer program embodied by a computer readable medium are also disclosed.

24 Claims, 11 Drawing Sheets

(52) U.S. Cl.
CPC .................. *G06F 3/04883* (2013.01); *G06F 2203/04109* (2013.01); *G06F 2203/04806* (2013.01); *G06F 2203/04808* (2013.01)

(58) Field of Classification Search
CPC ....... G06F 3/04883; G06F 2203/04109; G06F 2203/04806; G06F 2203/04808
USPC ............. 345/173–175; 705/14; 715/863, 776
See application file for complete search history.

(56) References Cited

U.S. PATENT DOCUMENTS

| | | |
|---|---|---|
| 6,297,838 B1* | 10/2001 | Chang et al. ................. 715/863 |
| 6,337,681 B1 | 1/2002 | Martin |
| 6,747,636 B2 | 6/2004 | Martin |
| 6,803,906 B1 | 10/2004 | Morrison et al. |
| 7,232,986 B2 | 6/2007 | Worthington et al. |
| 7,236,162 B2 | 6/2007 | Morrison et al. |
| 7,274,356 B2 | 9/2007 | Ung et al. |
| 2004/0039750 A1* | 2/2004 | Anderson ............. G06F 3/0483 |
| 2006/0133664 A1 | 6/2006 | Hong et al. |
| 2008/0029691 A1 | 2/2008 | Han |
| 2008/0077492 A1* | 3/2008 | Ho et al. ......................... 705/14 |
| 2009/0237367 A1* | 9/2009 | Ryu et al. ..................... 345/173 |
| 2010/0079409 A1 | 4/2010 | Sirotich et al. |
| 2010/0079493 A1 | 4/2010 | Tse et al. |
| 2010/0141605 A1* | 6/2010 | Kang ................... G06F 1/1626 345/174 |
| 2011/0050592 A1* | 3/2011 | Kim et al. .................... 345/173 |

* cited by examiner

FIG. 1A
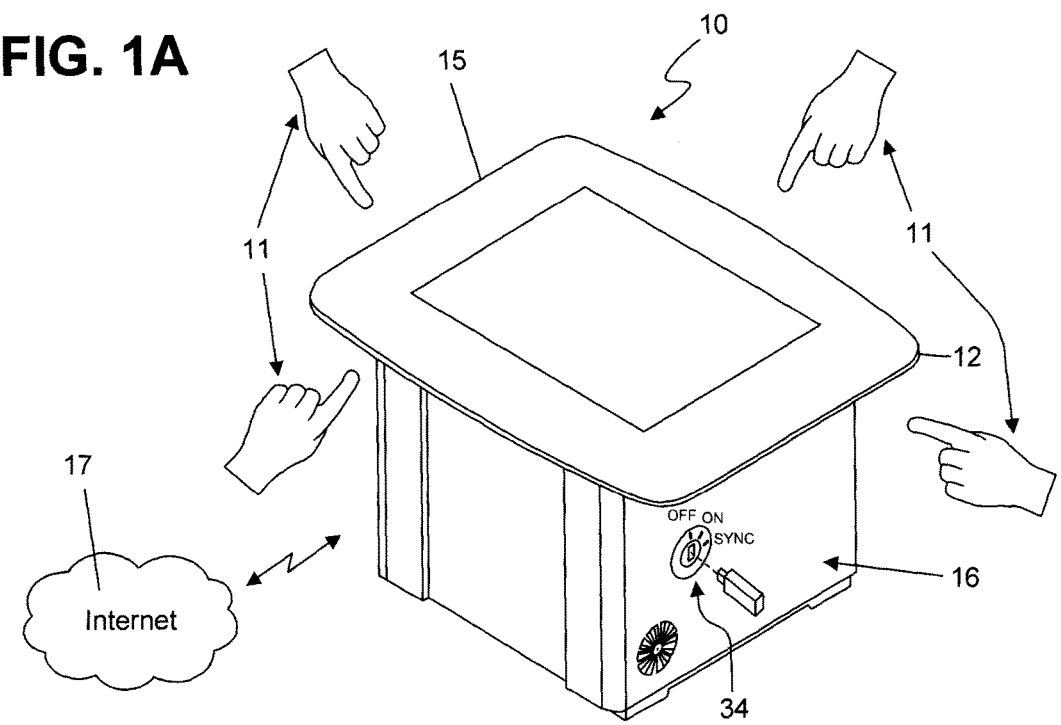
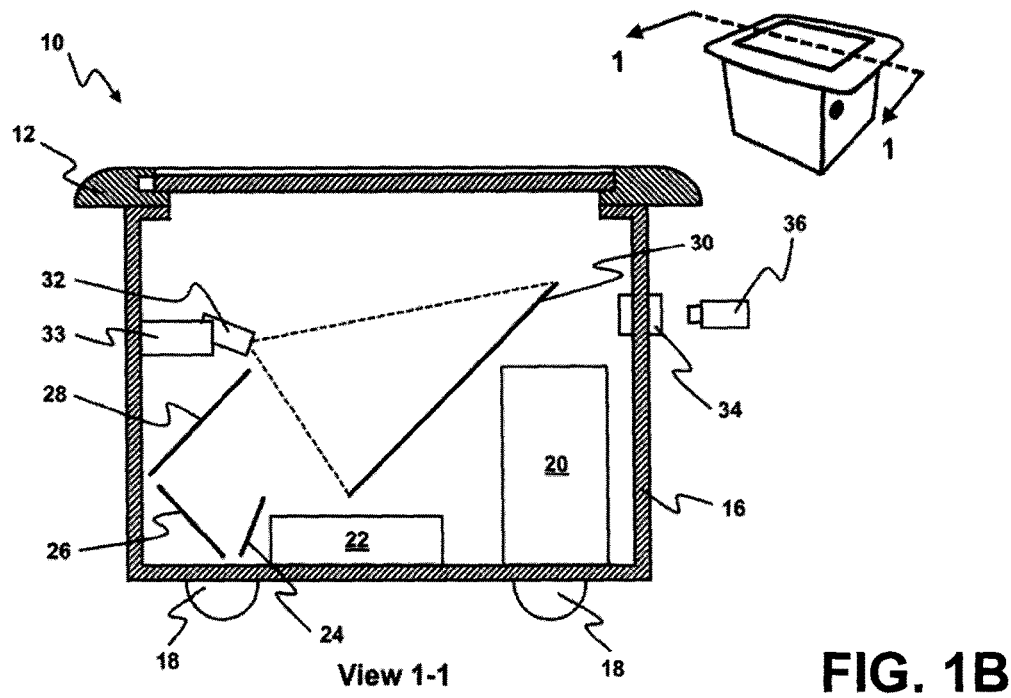
FIG. 1B

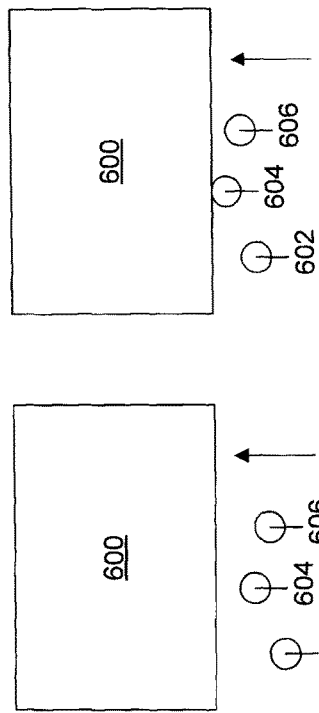
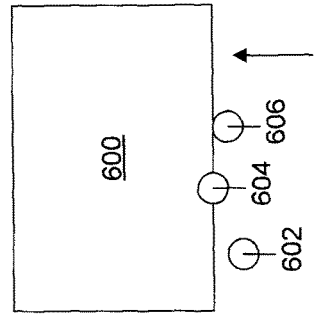
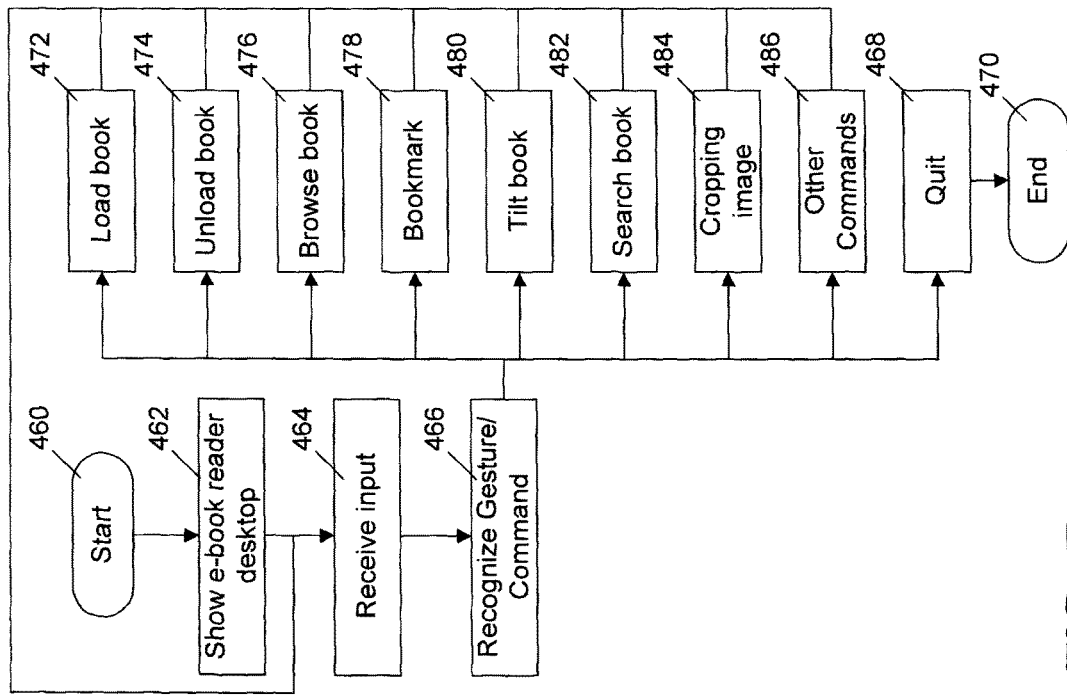
FIG. 8A
FIG. 8B
FIG. 8C
FIG. 7

| Touch(es) | Action | Area applied | Criteria | Gesture Meanings | |
|---|---|---|---|---|---|
| 3 or more pointers | Moving | On book | | Moving book, or unloading book (see description) | 630 |
| 2 or more pointers | Rotating | On book | | Rotating book | 632 |
| 1 pointer | Moving | On page | Outside book-tilting and book-turning zones and $|V_x| > T_2$ | | |
| 1 pointer | Moving | On cover | $|V_x| > T_2$ and towards inner edge | Flipping a page | 634 |
| 1 or more pointers | Crossing | Outer edge of page stack or page (when page stack is invisible) | $|V_x| > T_2$ | | |
| 1 pointer | Moving | On page stack | Starting position not on bookmark and $|V_x| > T_2$ | Jumping to page | 636 |
| 1 pointer | Tapping | On bookmark | | Jumping to bookmarked page | 638 |
| 1 pointer | Moving | On cover | $|V_x| > T_2$ and towards outer edge | | 640 |
| 1 or more pointers | Crossing | Inner edge of cover | $|V_x| > T_2$ | Turning book | |
| 1 pointer | Moving | On spine | $|V_x| > T_2$ | | |
| 1 or more pointers | Crossing | Spine | $|V_x| > T_2$ | | |
| 1 pointer | Moving | On book-tilting zone top/bottom edge | $|V_y| > T_2$ | Tilting book | 642 |
| 1 or more pointers | Crossing | On book | $|V_y| > T_2$ | | |
| 2 or more pointers | Moving apart | On book | | Zooming-in, or turning book (see description) | 644 |
| 2 or more pointers | Moving towards each other | On book | | Zooming-out, or turning book (see description) | 646 |
| 2 or more pointers | Moving | On bookshelf | $|V_x| > T_2$ | Scrolling book list | 648 |
| 1 pointer | Moving | On book in bookshelf | Moving out of bookshelf | Loading book | 650 |

FIG. 9

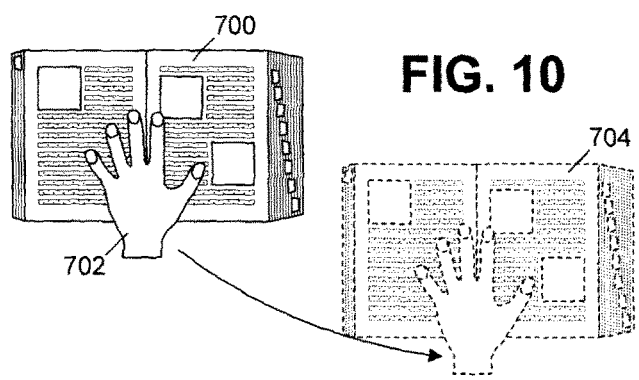
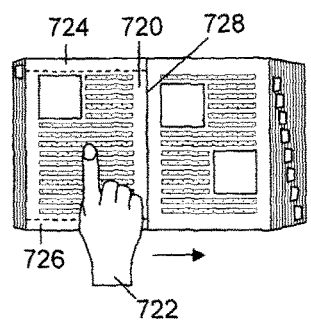
FIG. 10
FIG. 11A
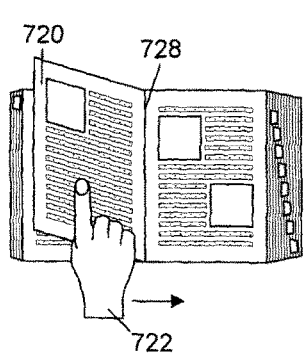
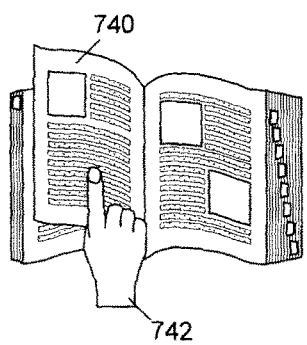
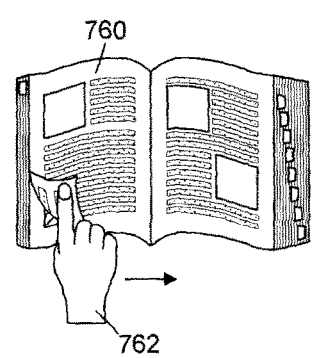
FIG. 11B    FIG. 11C    FIG. 11D
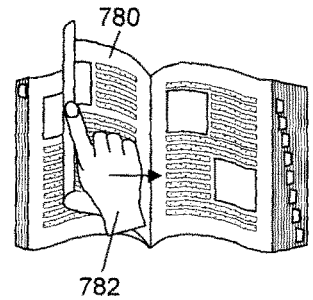
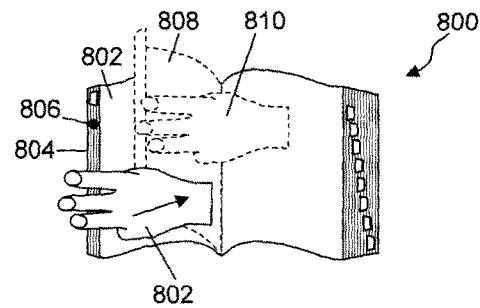
FIG. 11E    FIG. 11F

INTERACTIVE INPUT SYSTEM DISPLAYING AN E-BOOK GRAPHIC OBJECT AND METHOD OF MANIPULATING A E-BOOK GRAPHIC OBJECT

FIELD OF THE INVENTION

The present invention relates generally to e-book readers and in particular to an interactive input system and e-book reader application running thereon, for displaying and manipulating e-books.

BACKGROUND OF THE INVENTION

Electronic books (e-books) and devices for displaying and manipulating e-books, known as e-book readers, are well known. E-books are typically embodied as electronic files, such as PDF (Portable Document Format) or ePub files, which may be protected from unauthorized copying using a form of Digital Rights Management (DRM). For example, the ePub format supports combinations of text and images, along with DRM.

E-books are often consumable through software applications running on general purpose computing devices such as personal computers, laptops, tablet computers or smartphones. However, e-book readers, such as the Kindle™ by Amazon, the Nook™ by Barnes & Noble, and the Reader™ by Sony, are available that are purpose-built portable computing devices having a processing structure coupled to a display screen, one or more storage devices and a data interface such as a USB (Universal Serial Bus) port or a wireless network interface card to receive and display e-book files. Users of e-books access on-line e-book sources such as the well-known Amazon.com or Barnes and Noble websites and download e-books from the websites for consumption using their general purpose computing device and/or their e-book reader.

Where e-book readers are concerned, e-book content is typically displayed in black and white, with different shapes and sizes corresponding to the screen size and orientation of the e-book readers. It is typical for e-book readers to provide dedicated buttons for navigation through the e-book.

Publishers of e-books often avoid specifying restrictions on e-book layout characteristics in the e-book files, so as to allow e-book content to be displayed according to the attributes of the particular device being used to consume the e-book content. As such, the e-book reader or application is able to ensure an e-book is displayed according to the sizes and orientations of the display screen. However, e-books can be encoded so as to specify a particular layout. For example, particular page layout can be specified despite the display restrictions on the device. If, for example, a display device does not have sufficient resolution to show the entire e-book layout, the e-book reader or application can supplement by providing functionality for zooming in on the page.

While e-book readers are useful, many do not have a touch screen, and their screen sizes are typically small, usually varying between five (5) and ten (10) inches in size. As will be understood, the user experience is limited by the capabilities of the e-book reader itself. As such, software applications for displaying and manipulating e-books are available that ameliorate some of the limitations of the display devices. Such e-book applications can be provided with functionality for enhancing the user experience. For example, the FlippingBook™ Page Flip application offered by Page-Flip.com allows users to employ the mouse for flipping book pages when reading through an e-book. However, known examples of such applications tend to provide only very limited improvements to the reading experience, and accordingly do not approach the experience of reading a real book.

Interactive input systems that allow users to inject input (eg. digital ink, mouse events etc.) into an application program using an active pointer (eg. a pointer that emits light, sound or other signal), a passive pointer (eg. a finger, cylinder or other suitable object) or other suitable input device such as for example, a mouse or trackball, are known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 assigned to SMART Technologies ULC of Calgary, Alberta, Canada, assignee of the subject application, the contents of which are incorporated by reference; touch systems comprising touch panels employing electromagnetic, capacitive, acoustic or other technologies to register pointer input; tablet personal computers (PCs); laptop PCs; personal digital assistants (PDAs); and other similar devices.

Multi-touch interactive input systems that receive and process input from multiple pointers using machine vision are also known. One such type of multi-touch interactive input system exploits the well-known optical phenomenon of frustrated total internal reflection (FTIR). According to the general principles of FTIR, the total internal reflection (TIR) of light traveling through an optical waveguide is frustrated when an object such as a pointer touches the waveguide surface, due to a change in the index of refraction of the waveguide, causing some light to escape from the touch point. In a multi-touch interactive input system, the machine vision system captures images including the point(s) of escaped light, and processes the images to identify the position of the pointers on the waveguide surface based on the point(s) of escaped light for use as input to application programs. One example of an FTIR multi-touch interactive input system is disclosed in United States Patent Application Publication No. 2008/0029691 to Han.

It is an object of an aspect of the following to provide improvements in the display and manipulation of e-books using a multi-touch interactive input system.

SUMMARY OF THE INVENTION

In accordance with an aspect, there is provided an interactive input system comprising:

a touch panel; and processing structure displaying on the touch panel at least one graphic object depicting a book having one or more page stacks, the processing structure displaying each page stack of the book graphic object with a respective width that is based on a number of pages in the page stack.

In accordance with another aspect, there is provided a method for manipulating a book graphic object displayed on an interactive input system comprising:

tracking one or more touch points associated with the book graphic object;

in the event that the one or more touch points coincide with the location of a book page in a page stack of the book graphic object, associating at least the book page with a different page stack; and updating the respective widths of at least one of the page stacks based on the numbers of pages in the page stacks.

In accordance with another aspect, there is provided a computer readable medium embodying a computer program for manipulating a book graphic object displayed on an interactive input system, the computer program comprising:

program code tracking one or more touch points associated with the book graphic object;

program code, in the event that the one or more touch points coincide with the location of a book page in a page stack of the book graphic object, associating at least the book page with a different page stack; and program code updating the respective widths of at least one of the page stacks based on numbers of pages in the page stacks.

BRIEF DESCRIPTION OF THE DRAWINGS

Embodiments will now be described more fully with reference to the accompanying drawings in which:

FIG. 1A is a perspective view of an interactive input system;

FIG. 1B is a side sectional view of the interactive input system of FIG. 1A;

FIG. 7 is the top-level flowchart of an e-book reader application;

FIGS. 8A to 8C illustrate a multi-pointer crossing method;

FIG. 9 shows some gestures supported by the e-book reader application;

FIG. 10 illustrates the moving book gesture;

FIGS. 11A to 11F illustrate the flipping a page gestures;

DETAILED DESCRIPTION OF THE EMBODIMENTS

Figure 1C:
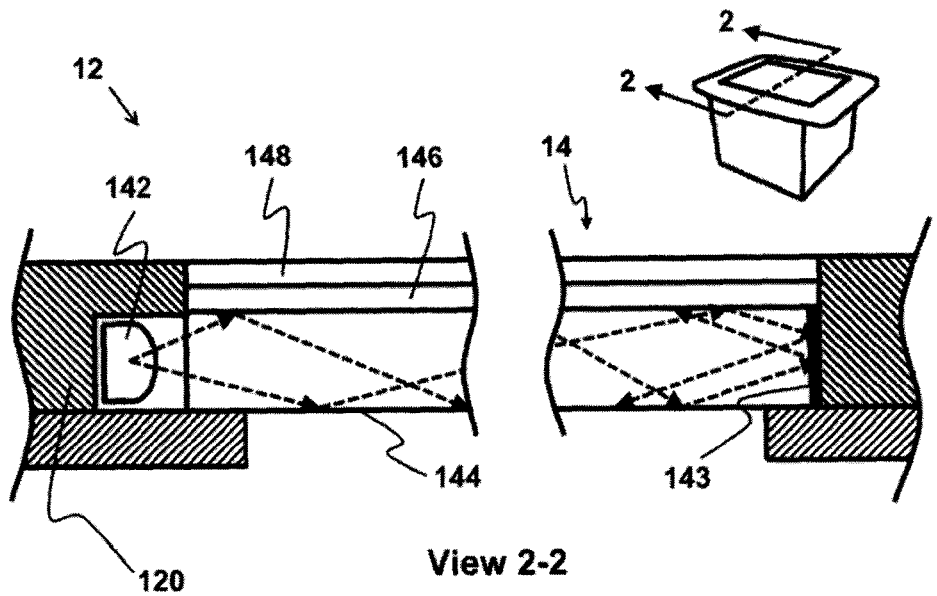
FIG. 1C a sectional view of a table top and touch panel forming part of the interactive input system of FIG. 1A.

In order to facilitate understanding of the e-book reader application, an example of an interactive input system on which the application may be operated to great advantage, will now be described. Turning now to FIG. 1A, a perspective diagram of an interactive input system in the form of a touch table is shown and is generally identified by reference numeral 10. Touch table 10 comprises a table top 12 mounted atop a cabinet 16. In this embodiment, cabinet 16 sits atop wheels, castors or the like 18 that enable the touch table 10 to be easily moved from place to place as requested. Integrated into table top 12 is a coordinate input device in the form of a frustrated total internal reflection (FTIR) based touch panel 14 that enables detection and tracking of one or more pointers 11, such as fingers, pens, hands, cylinders, or other objects, applied thereto.

Cabinet 16 supports the table top 12 and touch panel 14, and houses a processing structure 20 (see FIG. 1B) executing a host application and one or more application programs. Image data generated by the processing structure 20 is displayed on the touch panel 14 allowing a user to interact with the displayed image via pointer contacts on the display surface 15 of the touch panel 14. The processing structure 20 interprets pointer contacts as input to the running application program and updates the image data accordingly so that the image displayed on the display surface 15 reflects the pointer activity. In this manner, the touch panel 14 and processing structure 20 form a closed loop allowing pointer interactions with the touch panel 14 to be recorded as handwriting or drawing or used to control execution of the application program.

Processing structure 20 in this embodiment is a general purpose computing device in the form of a computer. The computer comprises for example, a processing unit, system memory (volatile and/or non-volatile memory), other non-removable or removable memory (a hard disk drive, RAM, ROM, EEPROM, CD-ROM, DVD, flash memory etc.) and a system bus coupling the various computer components to the processing unit.

During execution of the host software application/operating system run by the processing structure 20, a graphical user interface comprising a canvas page or palette (i.e., background), upon which graphic widgets are displayed, is displayed on the display surface of the touch panel 14. In this embodiment, the graphical user interface enables freeform or handwritten ink objects and other objects to be input and manipulated via pointer interaction with the display surface 15 of the touch panel 14.

The cabinet 16 also houses a horizontally-oriented projector 22, an infrared (IR) filter 24, and mirrors 26, 28 and 30. An imaging device 32 in the form of an infrared-detecting camera is mounted on a bracket 33 adjacent mirror 28. The system of mirrors 26, 28 and 30 functions to "fold" the images projected by projector 22 within cabinet 16 along the light path without unduly sacrificing image size. The overall touch table 10 dimensions can thereby be made compact.

The imaging device 32 is aimed at mirror 30 and thus sees a reflection of the display surface 15 in order to mitigate the appearance of hotspot noise in captured images that typically must be dealt with in systems having imaging devices that are aimed directly at the display surface itself. Imaging device 32 is positioned within the cabinet 16 by the bracket 33 so that it does not interfere with the light path of the projected image.

During operation of the touch table 10, processing structure 20 outputs video data to projector 22 which, in turn, projects images through the IR filter 24 onto the first mirror 26. The projected images, now with IR light having been substantially filtered out, are reflected by the first mirror 26 onto the second mirror 28. Second mirror 28 in turn reflects the images to the third mirror 30. The third mirror 30 reflects the projected video images onto the display (bottom) surface of the touch panel 14. The video images projected on the bottom surface of the touch panel 14 are viewable through the touch panel 14 from above. The system of three mirrors 26, 28, 30 configured as shown provides a compact path along which the projected image can be channeled to the display surface. Projector 22 is oriented horizontally in order to preserve projector bulb life, as commonly-available projectors are typically designed for horizontal placement.

An external data port/switch 34, in this embodiment a Universal Serial Bus (USB) port/switch, extends from the interior of the cabinet 16 through the cabinet wall to the exterior of the touch table 10 providing access for insertion and removal of a USB key 36, as well as switching of functions.

The USB port/switch 34, projector 22, and IR-detecting camera 32 are each connected to and managed by the processing structure 20. A power supply (not shown) supplies electrical power to the electrical components of the touch table 10. The power supply may be an external unit or, for example, a universal power supply within the cabinet 16 for improving portability of the touch table 10. The cabinet 16 fully encloses its contents in order to restrict the levels of ambient visible and infrared light entering the cabinet 16 thereby to facilitate satisfactory signal to noise performance. Doing this can compete with various techniques for managing heat within the cabinet 16. The touch panel 14, the projector 22, and the processing structure are all sources of heat, and such heat if contained within the cabinet 16 for extended periods of time can reduce the life of components, affect performance of components, and create heat waves that can distort the optical components of the touch table 10. As such, the cabinet 16 houses heat managing provisions (not shown) to introduce cooler ambient air into the cabinet while exhausting hot air from the cabinet. For example, the heat management provisions may be of the type disclosed in U.S. patent application Ser. No. 12/240,953 to Sirotich et al., filed on Sep. 29, 2008 entitled "TOUCH PANEL FOR INTERACTIVE INPUT SYSTEM AND INTERACTIVE INPUT SYSTEM EMPLOYING THE TOUCH PANEL" and assigned to SMART Technologies ULC of Calgary, Alberta, the assignee of the subject application, the content of which is incorporated herein by reference.

As set out above, the touch panel 14 of touch table 10 operates based on the principles of frustrated total internal reflection (FTIR), as described in further detail in the above-mentioned U.S. patent application Ser. No. 12/240, 953 to Sirotich et al., referred to above. FIG. 1C is a sectional view of the table top 12 and touch panel 14. Table top 12 comprises a frame 120 formed of plastic supporting the touch panel 14.

Touch panel 14 comprises an optical waveguide 144 that, according to this embodiment, is a sheet of acrylic. A resilient diffusion layer 146, in this embodiment a layer of V-CARE® V-LITE® barrier fabric manufactured by Vintex Inc. of Mount Forest, Ontario, Canada, or other suitable material lies against the optical waveguide 144.

The diffusion layer 146, when pressed into contact with the optical waveguide 144, substantially reflects the IR light escaping the optical waveguide 144 so that the escaping IR light travels down into the cabinet 16. The diffusion layer 146 also diffuses visible light being projected onto it in order to display the projected image.

Overlying the resilient diffusion layer 146 on the opposite side of the optical waveguide 144 is a clear, protective layer 148 having a smooth touch surface. In this embodiment, the protective layer 148 is a thin sheet of polycarbonate material over which is applied a hardcoat of Marnot® material, manufactured by Tekra Corporation of New Berlin, Wis., U.S.A. While the touch panel 14 may function without the protective layer 148, the protective layer 148 permits use of the touch panel 14 without undue discoloration, snagging or creasing of the underlying diffusion layer 146, and without undue wear on users' fingers. Furthermore, the protective layer 148 provides abrasion, scratch and chemical resistance to the overall touch panel 14, as is useful for panel longevity.

The protective layer 148, diffusion layer 146, and optical waveguide 144 are clamped together at their edges as a unit and mounted within the table top 12. Over time, prolonged use may wear one or more of the layers. As desired, the edges of the layers may be unclamped in order to inexpensively provide replacements for the worn layers. It will be understood that the layers may be kept together in other ways, such as by use of one or more of adhesives, friction fit, screws, nails, or other fastening methods.

An IR light source comprising a bank of infrared light emitting diodes (LEDs) 142 is positioned along at least one side surface of the optical waveguide 144. Each LED 142 emits infrared light into the optical waveguide 144. In this embodiment, the side surface along which the IR LEDs 142 are positioned is flame-polished to facilitate reception of light from the IR LEDs 142. An air gap of 1-2 millimeters (mm) is maintained between the IR LEDs 142 and the side surface of the optical waveguide 144 in order to reduce heat transmittance from the IR LEDs 142 to the optical waveguide 144, and thereby mitigate heat distortions in the acrylic optical waveguide 144. Bonded to the other side surfaces of the optical waveguide 144 is reflective tape 143 to reflect light back into the optical waveguide 144 thereby saturating the optical waveguide 144 with infrared illumination.

In operation, IR light is introduced via the flame-polished side surface of the optical waveguide 144 in a direction generally parallel to its large upper and lower surfaces. The IR light does not escape through the upper or lower surfaces of the optical waveguide 144 due to total internal reflection (TIR) because its angle of incidence at the upper and lower surfaces is not sufficient to allow for its escape. The IR light reaching other side surfaces is generally reflected entirely back into the optical waveguide 144 by the reflective tape 143 at the other side surfaces.

When a user contacts the display surface of the touch panel 14 with a pointer 11, the pressure of the pointer 11 against the protective layer 148 compresses the resilient diffusion layer 146 against the optical waveguide 144, causing the index of refraction on the optical waveguide 144 at the contact point of the pointer 11, or "touch point," to change. This change "frustrates" the TIR at the touch point causing IR light to reflect at an angle that allows it to escape from the optical waveguide 144 in a direction generally perpendicular to the plane of the optical waveguide 144 at the touch point. The escaping IR light reflects off of the point 11 and scatters locally downward through the optical waveguide 144 and exits the optical waveguide 144 through its bottom surface. This occurs for each pointer 11 as it contacts the display surface of the touch panel 114 at a respective touch point.

As each touch point is moved along the display surface 15 of the touch panel 14, the compression of the resilient diffusion layer 146 against the optical waveguide 144 occurs and thus escaping of IR light tracks the touch point movement. During touch point movement or upon removal of the touch point, decompression of the diffusion layer 146 where the touch point had previously been due to the resilience of the diffusion layer 146, causes escape of IR light from optical waveguide 144 to once again cease. As such, IR light escapes from the optical waveguide 144 only at touch point location(s) allowing the IR light to be captured in image frames acquired by the imaging device.

The imaging device 32 captures two-dimensional, IR video images of the third mirror 30. IR light having been filtered from the images projected by projector 22, in combination with the cabinet 16 substantially keeping out ambient light, ensures that the background of the images captured by imaging device 32 is substantially black. When the display surface 15 of the touch panel 14 is contacted by one or more pointers as described above, the images captured by IR camera 32 comprise one or more bright points corresponding to respective touch points. The processing structure 20 receives the captured images and performs image processing to detect the coordinates and characteristics of the one or more touch points based on the one or more bright points in the captured images. The detected coordinates are then mapped to display coordinates and interpreted as ink or mouse events by the processing structure 20 for manipulating the displayed image.

Preferably, the size of each touch point is also detected, and is compared with the previously detected size of the same touch point to gauge a level of pressure of the touch point. For example, should the size of the touch point increase due to an increase in pressure of the pointer—typically a user's finger—against the touch panel 14, the pressure increase is tracked as a function of size increase of the touch point. Similarly, should the size of the touch point decrease due to a decrease in pressure of the pointer against the touch panel 14, the pressure decrease is tracked as a function of the size decrease of the touch point.

The processing structure 20 connects to a network 17, e.g., a local area network (LAN) and/or the Internet, via a suitable wired or wireless connection interface. Applications accordingly can access the network and obtain online resources, download e-books, and so forth. Wired or wireless networking technologies are known and details as to networking are therefore not described further.

Figure 2:
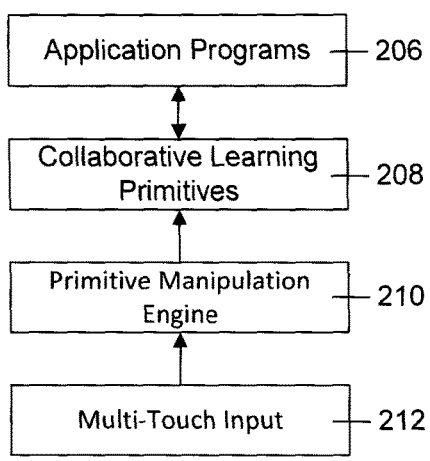
FIG. 2 is a block diagram illustrating the software structure of the interactive input system.

FIG. 2 is a block diagram illustrating the software structure of the touch table interactive input system 10. A primitive manipulation engine 210, part of the host application, monitors the touch panel 14 to capture touch point data 212 and generate contact events. The primitive manipulation engine 210 also analyzes touch point data 212 and recognizes known gestures made by touch points. The generated contact events and recognized gestures are then provided by the host application to the collaborative learning primitives 208 which include graphic objects 106 such as for example the canvas, buttons, images, shapes, video clips, freeform and ink objects. The application programs 206 organize and manipulate the collaborative learning primitives 208 to respond to user's input. At the instruction of the application programs 206, the collaborative learning primitives 208 modify the image displayed on the display surface 15 to respond to users' interaction.

The primitive manipulation engine 210 tracks each touch point based on the touch point data 212, and handles continuity processing between image frames. More particularly, the primitive manipulation engine 210 receives touch point data 212 from frames and based on the touch point data 212 determines whether to register a new touch point, modify an existing touch point, or cancel/delete an existing touch point. Thus, the primitive manipulation engine 210 registers a contact down event representing a new touch point when it receives touch point data 212 that is not related to an existing touch point, and accords the new touch point a unique identifier. Touch point data 212 may be considered unrelated to an existing touch point if it characterizes a touch point that is a threshold distance away from an existing touch point, for example. The primitive manipulation engine 210 registers a contact move event representing movement of the touch point when it receives touch point data 212 that is related to an existing pointer, for example by being within a threshold distance of, or overlapping an existing touch point, but having a different focal point. The primitive manipulation engine 210 registers a contact up event representing removal of the touch point from the surface of the touch panel 104 when reception of touch point data 212 that can be associated with an existing touch point ceases to be received from subsequent images. The contact down, move and up events are passed to respective collaborative learning primitives 208 of the user interface such as graphic objects, e-book objects and objects related to the e-book objects, widgets, or the background or canvas 108, based on which of these the touch point is currently associated with, and/or the touch point's current position.

A USB key 36 (see FIG. 1B) may be used by users to store and upload e-books and other content to touch table 10.

Application programs 206 organize and manipulate collaborative learning primitives 208 in accordance with user input to achieve different behaviours, such as scaling, rotating, and moving, or other behaviours as will be described. The application programs 206 may detect the release of a first graphic object over a second graphic object, and invoke functions that exploit relative position information of the objects. Such functions may include those functions handling object matching, mapping, and/or sorting. Content developers may employ such basic functions to develop and implement collaboration scenarios and rules. Moreover, these application programs 206 may be provided by the provider of the touch table 10 or by third party programmers developing applications based on a software development kit (SDK) for the touch table 10.

Figure 3:
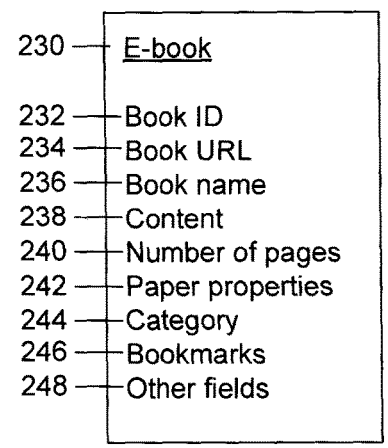
FIG. 3 illustrates an exemplary e-book object structure.

An e-book reader application as will be described is an application program 206 suitable for running on the touch table 10 that allows user to open, browse, manipulate and search e-books and similar documents. The data structure of an exemplary e-book file 230 or object is illustrated in FIG. 3.

The e-book object, or simply e-book, 230 comprises attributes including a book ID 232, a book Uniform Resource Locator (URL) 234, a book name 236, the book content 238, a number of pages 240, paper properties 242, book classification category 244, bookmarks 246 (including predefined and/or user-defined bookmarks). These attributes may be stored in particular object fields or as freeform data structured using XML (eXtensible Markup Language), for example. Other fields 248 or freeform data may be provided. Such other fields or freeform data might include one or more of: ISBN number (if available), links to the publisher's website or resource websites, user annotations, book dimension, layout-changeable flag (whether the layout of the e-book can be changed by the e-book reader to match the screen's dimension, for example), table of contents, index, last opened page, etc.

The book ID 232 uniquely identifies an e-book in the system. A particular format or level of uniqueness of book ID 232 is, in this embodiment, not specified. For example, the book ID 232 may be unique only within a library of books, or alternatively it may be a Globally Unique Identifier (GUID) which is unique in any context. The book ID 232 may be the ISBN number, for example.

The book URL 234 indicates a storage location of the e-book file, which may be stored at a particular storage location—for example in a particular folder—in the electronic memory of the e-book reader itself, or at another location accessible via the network such as within a folder on a server or an external storage device.

The content 238 comprises text, images, audio/video clips, web links, interactive widgets, and/or other suitable types of multimedia. The content 238 may be authored by a publisher, and/or scanned images of a paper-based book.

Paper properties 242 represents attributes corresponding to the physical properties of the page and binding material of a real book. This data is usable by the e-book reader application to modify viewing and manipulating of the e-book, so as to strengthen the metaphor for a real book. For example, in this embodiment, paper properties 242 comprises the sub-properties of paper solidness (hard or soft), paper thickness (a value between a predefined thickness range simulating the thickness of the paper of a book, a magazine, or cardboard paper used for kids' board books), texture, background colour, etc. Paper properties 242 may be associated with the entire e-book object, such that its settings are applied to the entire book. However, it may be desirable for a publisher to associate paper properties 242 with individual pages or larger portions of e-book content 238, in order to enable each page of the e-book to have a respective look and feel.

The e-book reader application reacts to the content of the above-described e-book attributes to create an e-book object, to define the e-book object's behaviours, and to draw the e-book object on the touch panel 14 as a 3-D graphic object with some limited perspective views. The user may touch the touch panel 14 at a position corresponding to the displayed e-book object, and accordingly may move, rotate, turn, or otherwise manipulate the e-book object. However, as will be described later, the e-book reader application imparts restrictions as to the extent to which the e-book can be manipulated by a user so as to ensure manipulation does not put the e-book object into a condition that would unduly impair a user's ability to read, annotate or otherwise usefully manipulate the e-book.

Figure 4A:
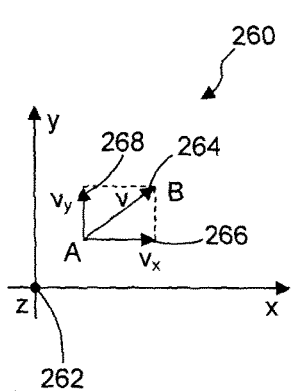
FIG. 4A shows the coordinate system for an e-book object.

The following examples illustrate some e-book objects and means by which they may be manipulated. In the following description, a three-dimensional coordinate system 260 for each e-book object is referred to, as shown in FIG. 4A. More particularly, the x-y plane of the coordinate system 260 is parallel to the touch surface, where the x-axis runs parallel to the direction in which pages may be turned. For example, for an e-book with pages that are to be flipped from left to right and vice versa (see FIG. 4A), the x-axis is horizontal, and the y-axis is vertical. The z-axis, represented by the dot 262, is perpendicular to the x-y plane and therefore extends into and out of the page.

Accordingly, the coordinate system for an e-book with pages that are to be flipped from top to bottom and vice versa, the x-axis is vertical, and the y-axis is horizontal, with a z-axis that is perpendicular to the x-y plane. The coordinate system for a book rotated on the touch surface is defined in a similar manner. Furthermore, in the following description, going forward refers to flipping pages of an e-book from right to left, such as would be achieved when progressing from page 7 to 8 or 8 to 9 of the e-book. Going in reverse accordingly refers to flipping pages of an e-book from left to right, such as would be achieved when turning from page 9 to 8 or 8 to 7 of the e-book.

When a pointer such as a finger comes into contact with, and moves upon the touch surface, the pointer movement is processed as described above as a movement vector v. For example, in FIG. 4A, should a pointer contact and be moved on the touch surface for a short distance from point A to point B, the movement vector v is then defined as the line segment 264 between points A and B, having a direction from point A to point B.

Should the pointer be moved along a curved trace, its movement vector at each point on the trace is the first-order derivative of the function of the trace ie., the tangent of the point on the trace. A movement vector v 264 may be decomposed into a respective Vx component 266 along the x-axis and a Vy component 268 along the y-axis.

Figure 4B:
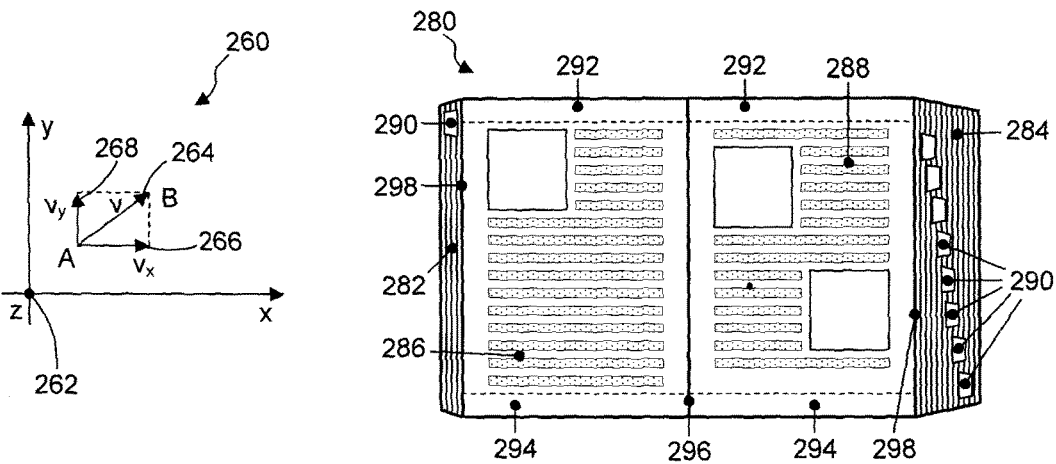
FIG. 4B shows an exemplary book object at the opening book state having solid paper settings.

An opened e-book object 280 is shown in FIG. 4B. The e-book object 280 comprises several elements, including page stacks 282 and 284, and open pages 286 and 288. In this embodiment, the e-book object 280 comprises bookmarks 290, which are displayed at corresponding positions in the page stacks 282 and 284. A book spine (not shown in FIG. 4B) is also defined in the middle of the opened e-book object 280. In the following description, an edge 296 of a page 286 or 288 that is adjacent and parallel to the book spine is referred to as the inner edge of the page 286 or 288, whereas the edge 298 of a page 286 or 288 that is opposite to the inner edge 286 is referred to as the outer edge of the page 286 or 288.

In this embodiment, the respective widths of page stacks 282 and 284 are proportional to the total number of pages currently in the page stacks 282 and 284. The widths provide a visual cue to reflect the "thickness" of a real book. Accordingly, an e-book having many pages, such as an encyclopaedia, is displayed with wider page stacks than is an e-book having fewer pages, such as a children's storybook or a magazine. Preferably, the displayed width of the page stacks is also based on the page thickness attribute referred to above, such that page stacks of an e-book object having an attribute corresponding to a thick page stock will appear wider than those with the same number of pages but having an attribute corresponding to a thinner page stock.

As can be seen in FIG. 4B, the width of each page stack 282 and 284 is dependent upon how many pages are currently in each stack. This is determined according to which page is currently open. More particularly, the width of a page stack 282 or 284 is proportional to the number of pages in the particular page stack. The user is thereby provided with a strong visual indication as to whether the user is reading a page that is closer to the beginning or to the end of the e-book, or about halfway through. For example, the widths of page stacks 282 and 284 of the e-book object 280 in FIG. 4B indicates that the position at which the user has the e-book open is closer to the beginning of the e-book than to the end by displaying page stack 284 to be wider than page stack 282.

Each bookmark 290 is shown in the page stack 282 or 284 with its x-axis coordinates approximately proportional to the position the page containing the bookmark is located in the book. The bookmarks 290 are also arranged to be distributed along the y-axis. Each of these positions provides a strong visual metaphor with real books, but also eases the touch selection of a particular location in the book by logically spacing the bookmarks 290 apart from each other.

Figure 4C:
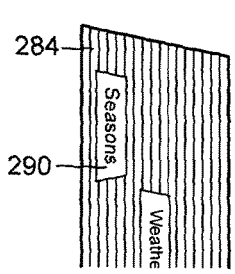
FIG. 4C shows a part of an enlarged page stack.

FIG. 4C shows an enlarged portion of the page stack 284, and some bookmarks 290 for "Seasons" and "Weather". Each bookmark 290 is itself a graphic object associated with the e-book object 280, that when touched, causes the currently opened page to be closed, and the bookmarked page to be opened. The width of the pages stacks 282 and 284 changes based on the position within the e-book at which the bookmarked pages is located, just as though the user turned multiple pages at once.

Referring again to FIG. 4B, a first book-tilting zone 292 and a second book-tilting zone 294 overlie the top and bottom margins, respectively, of each of page 286 and page 288. Touching within either of the zones 292 and 294 and dragging the pointer causes the e-book object to tilt accordingly, as will be described.

The appearance and behaviour of each page 286/288 accords with paper solidness and thickness attributes. For the e-book object 280 shown in FIG. 4A, the paper solidness for all pages is set to a value corresponding to "solid" and the paper thickness is set to a value corresponding to "magazine paper". In accordance with these settings, pages 286 and 288 are drawn as "flat" pages with the border having a line thickness corresponding to the paper thickness value. As will be described, when a page is flipped, the animation of page flipping also accords with the paper solidness and thickness thereby to provide the user the experience of flipping a hard page.

Figure 4D:
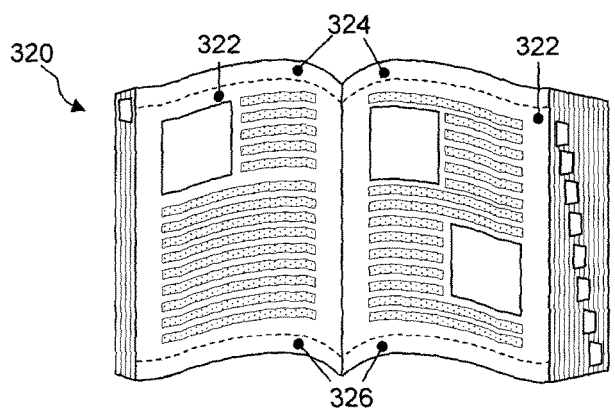
FIG. 4D shows another exemplary e-book object at the opening book state having soft paper settings.

In contrast to solidness being set to a value corresponding to "solid" and thickness being set to a value corresponding to "magazine paper", FIG. 4D shows another exemplary book object 320 having the paper solidness attribute for all pages set to a value corresponding to "soft" and the paper thickness attribute for all pages set to a value corresponding to "regular book paper". Pages 322 in this book, as well as the content shown thereon, are thus drawn in a curved manner with a curvature corresponding to the value of the paper solidness, and with borders having a thickness corresponding to the value of the paper thickness. As will be described, when a page is flipped, the animation of page flipping also accords with the paper solidness and the paper thickness properties to provide the user the experience of flipping a soft page. It can be seen also in FIG. 4B that first and second book-tilting zones 324 and 326, respectively, also overlie corresponding portions of each page 322 of e-book object 320.

Figure 4E:
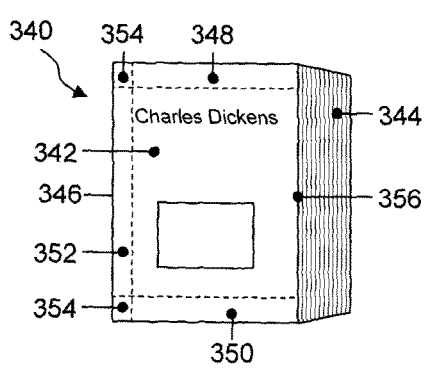
FIG. 4E shows another exemplary e-book object at the front cover state.

FIG. 4E shows a closed e-book object 340. In this state, the front cover 342 of the e-book object 340 is fully visible. Since the e-book object 340 does not contain any bookmarks, no bookmarks are shown in the single page stack 344. It will be noted that only one page stack 344 is displayed; since the number of pages in the other stack is zero, the other page stack, which is positioned on the left side of the e-book object 340 along the book spine edge 346 is set to a width of zero, making it invisible.

For the ease of description, the inner edge refers to the book spine edge 346, and the outer edge 356 is opposite to the inner edge. Furthermore, the front cover 342 is overlaid with a first book-tilting zone 348 at a position corresponding to the top margin and a second book-tilting zone 350 at a position corresponding to the bottom margin.

Figure 4F:
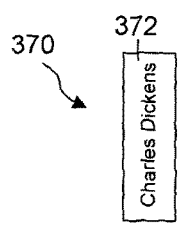
FIG. 4F shows another exemplary e-book object at the book spine state.

In a preferred embodiment, the entirety of the front and back covers, with the exception of the book-tilting zone(s) defined thereover, can each be used to turn the book and to flip the covers as a page is flipped. Book turning refers to orienting the e-book object such that only the spine or the edge view of the pages of the e-book object is made visible. A spine view is shown in FIG. 4F. Book turning and page flipping are respectively interpreted based on the direction Vx with respect to the outer edge 356 in which the pointer is moved from its initial touch point. For example, a pointer touching the front cover 342 and moving towards the outer edge 356 is interpreted as a turning gesture. However, a pointer touching the front cover 342 and moving towards from the inner edge 346 ie. away from the outer edge 356, is interpreted as flipping. Similarly, a pointer touching the back cover (not shown) and moving towards the outer edge 356 is interpreted as a turning gesture, whereas a pointer touching the back cover and moving towards the book spine edge 346 is interpreted as flipping.

In an alternative embodiment however, as shown in FIG. 4E, a book-turning zone 352 is defined on the front cover 342 along the book spine edge 346 opposite to the visible page stack 344. A pointer touching the book turning zone 352 and moving towards the outer edge 356 would be interpreted as a turning gesture such that the e-book object 340 would be turned so that the spine 372 of the e-book object 340 would be visible. A pointer touching the book turning zone 352 and moving towards the inner edge 346 would be interpreted also as a turning gesture but such that the edge view of the pages of the e-book object 340 would be visible. Preferably, a pointer touching any of the two corner zones 354 where the book-turning zone 352 and the book-tilting zones 350 overlap and moving is interpreted as both book tilting and book turning gestures. However, it will be appreciated that the corner zones 354 may also be established as either the book-tilting zone 350 or the book-turning zone 352, or neither.

Referring again to FIG. 4F, there is illustrated an e-book object 370 at a position showing its spine 372. The book name, or other information about the book, is shown on the book spine 372. As will be described, an e-book may be positioned in a number of ways, so as to show its front cover (see FIG. 4E), its spine (see FIG. 4F), or its back cover (not shown).

Each orientation, or range of orientations, of an e-book object corresponds to a particular state. For example, an e-book object will have an orientation or range of orientations that correspond to an opened state, an orientation or range of orientations that correspond to a closed front cover state, an orientation or range of orientations that correspond to a closed back cover state, and an orientation or range of orientations that correspond to a closed book spine or page edge state. Furthermore, in this embodiment each e-book object includes a set of standard sizes that correspond to the particular state. These sizes may be predefined by the publisher or author. For example, when in a closed book spine or page edge state, the e-book object may be ten inches tall. When in an open book state, the e-book object may be ten inches tall, or somewhat shorter or taller than ten inches. While sizes may be predefined, the e-book reader application is also equipped with default values corresponding to standard sizes for e-books for which predefined sizes are not specified. In an embodiment, it is required that the standard size for the book spine state is smaller than that for the front/back cover state, and the standard size for the front/back cover state is smaller than that for the opened book state.

Each e-book object may comprise a maximum size and minimum size for each state. The e-book reader application also provides default values of the maximum/minimum sizes for e-books for which predefined maximum/minimum sizes have not been specified. In an embodiment, it is required that the maximum size for the book spine state is smaller than the minimum size for the front/back cover state, and the maximum size for the front/back cover state is smaller than the minimum size for the opened book state.

Figure 5:
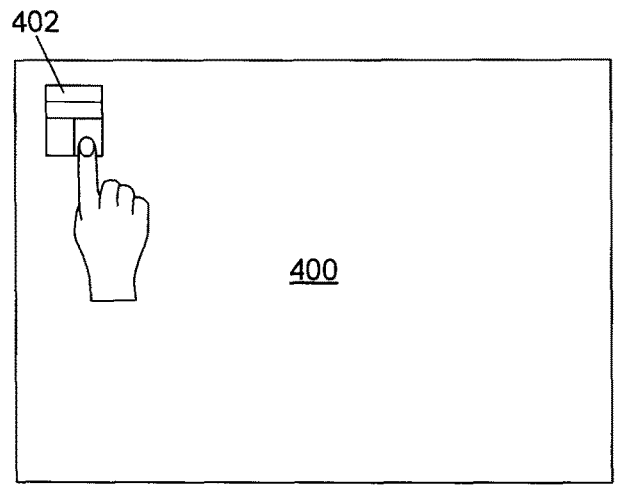
FIG. 5 illustrates the e-book reader application desktop with a bookshelf icon.

The e-book reader application comprises a bookshelf for browsing, searching and opening books. FIG. 5 shows the e-book reader desktop 400 with a bookshelf icon 402. When the e-book reader application is running, the e-book reader desktop 400 is generally in a full-screen mode occupying the entire display area of the touch screen. However, the e-book reader may be run in window mode. Touching the bookshelf icon 402 causes a book shelf image to be displayed.

Figure 6A:
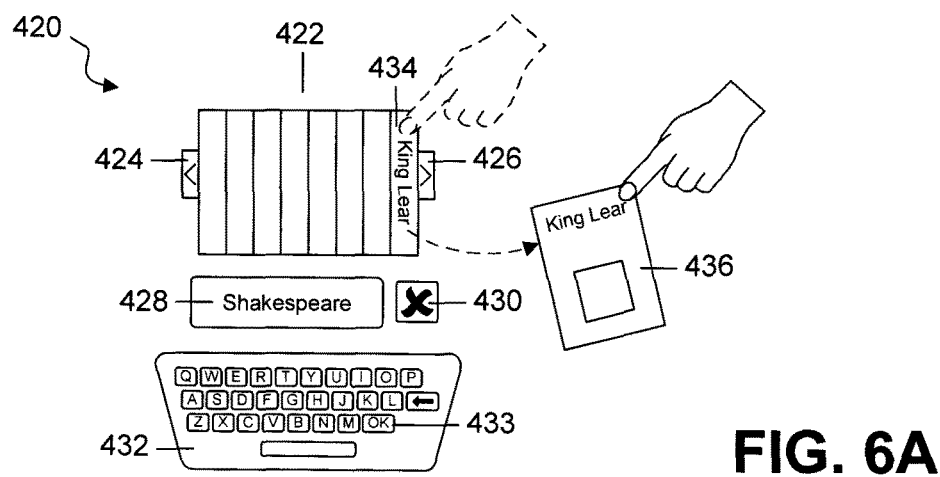
FIG. 6A shows a first exemplary bookshelf object.
Figure 6B:
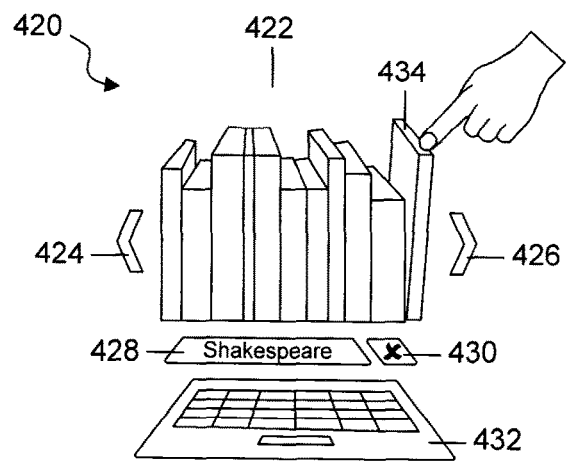
FIG. 6B shows a second exemplary bookshelf object.

FIG. 6A shows an exemplary book shelf 420 displayed in a two-dimensional form. The book shelf 420 displays the spines of e-book objects. Left and right scroll buttons 424 and 426, respectively, for scrolling through the set of e-book objects where there are more e-book objects than can be displayed on the bookshelf at one time due to limited screen real-estate, are displayed. The bookshelf view also comprises a text box 428, a "clear" button 430 and an on-screen keyboard 432 for book searching (described later). The two-dimensional book shelf may be viewable in three dimensions as shown in FIG. 6B by using the tilting gesture (described later). Initially, the book list 422 comprises the books cached in the e-book reader system. Alternatively, the book list 422 may be the results of a previous book search, or top 10 suggestions by an online bookseller, or some other collection.

When a user selects an e-book 434 by touching its spine and dragging the pointer so as to drag the e-book off of the book shelf 420, a book cover image 436 is then displayed. Upon released of the touch point, the full e-book object is loaded for the user to read and manipulate fully.

FIG. 7 is a flowchart showing steps for manipulating an e-book object using the e-book reader application. In the examples described below, the e-book reader recognizes the user's gestures for manipulating the e-book object. However, it will be appreciated that interactions with a physical keyboard, mouse and/or menu system may be used to manipulate the e-book object.

After the e-book reader application is started (step 460), the e-book reader application first shows the e-book reader desktop (step 462). Upon receipt of user input (step 464), such as single or multiple touches on the touch surface, keyboard or mouse input, the application interprets the user input as gestures/commands in the relevant context, including the current tool mode (pen, pointer, eraser, etc.), the area in which the gesture has been applied, etc. (step 466). If the gesture/command is a "Quit Program" gesture/command (e.g., an "Exit" gesture, or an "Exit" button being pressed), the process branches to step 468 to release the resources allocated to the e-book reader application, and terminates the application. The process is then ended (step 470).

However, if at step 466, e-book manipulation gestures/commands are recognized, the process then branches to corresponding processing steps, including loading an e-book reader object into system memory for access via the e-book reader (step 472), or unloading an e-book object (step 474), or browsing an e-book object (step 476) which may include flipping pages and/or turning the e-book object as described above, or bookmarking (step 478), or tilting the e-book object (step 480), searching (step 482), cropping an image (step 484), and other command processing (step 486) which may include, for example, opening the bookshelf, annotating an e-book object, or other operations.

When loading an e-book object into system memory (step 472), the application first obtains the URL of the e-book that is designated by the user. The URL may be obtained directly from search results, or via the book ID in search results. The application then instantiates an e-book object in system memory using the corresponding attributes, and draws the e-book object on the e-book reader application desktop. As will be described, the format of the e-book may be converted prior to being loaded into system memory.

In this embodiment, upon loading of the e-book object, the current page of the e-book to be opened is initialized as the front cover. As a result, when the e-book object is first displayed, the front cover is visible. Preferably, however, the current page of the e-book object is set to the page that had been open just prior to the e-book object having been unloaded from the e-book reader application. In order to achieve this, the current page is stored as an attribute of the e-book object, and this attribute persists in non-volatile memory associated with the e-book file, so as to be accessible when the e-book file is used to populate the e-book object when later re-instantiated. This feature is therefore similar to a bookmark.

After the e-book object is loaded into system memory, the user may read and/or manipulate the e-book object as referred to above (steps 476 to 486). In the event that the user wants to unload the e-book object (to the user this may be analogous to closing a file, or "shelving" the e-book), the user performs an unloading gesture/command, the "Current Page" attribute and any other attributes such as bookmarks and annotations in the e-book object are used to update the records associated with the e-book file in non-volatile memory, and the e-book is thereafter unloaded from the system memory (step 474).

In this embodiment, the gesture/command for unloading an e-book object from system memory is simply dragging the e-book object from the e-book reader application desktop to the bookshelf. In addition, or as an alternative, a "Close Book" icon may overlie the e-book object, or be positioned elsewhere on the e-book reader application desktop. Touching the "Close Book" icon causes the e-book reader application to remove the e-book object from view, insert a spine view into the bookshelf, and to delete the e-book object from system memory thereby to release the resources associated with the e-book object. In a similar manner to windows, an e-book object may be minimized and therefore not fully viewable. Furthermore, multiple e-book objects may be loaded onto a single desktop and individually read and/or manipulated.

Numerous gestures are implemented in the e-book reader system to facilitate user's operation. Gestures are recognized based on the touch mode, the number of touches applied, touch actions, the area the touches applying to and the criteria associated with the gestures. In some embodiments, the e-book reader application defines four touch modes: pointer, pen, eraser and cropping tool. Other touch modes may be provided.

In some embodiments, buttons—icons that react to touch interaction—are used for switching between touch modes. For example, touching a pen button forces touch inputs to the pen mode, in which the user may overlie e-book pages with digital ink for annotation. Touching an eraser button switches the input mode to the eraser mode, in which the user may erase digital ink by moving the touch point (visually represented by an eraser image) over the digital ink to be erased. Touching the cropping tool button switches the input mode to the image-cropping mode, and touching the pointer button switches the input mode to the pointer mode.

Alternatively or in some combination, particular pointer gestures may be employed to switch between input modes. Alternatively, where digital pens are used in the e-book reader application, the input mode may be switched by detecting the pen status. For example, when the writing end of a pen is detected contacting the touch surface, the input mode is automatically switched to the pen mode. When the erasing end of a pen is detected contacting the touch surface, the input mode is switched to the eraser mode. When the pen is placed back to the pen tray, this is detected by the closing of a pen tray switch, and the input mode is switched to the pointer mode in which a pointer can be used to manipulate an e-book object.

When recognizing gestures in the pointer mode, the system first checks the number of touches applied on the object, and then recognizes the gesture by checking the respective motion of the touch points over time, the area on the e-book object or the desktop that the touch points are associated with, and the criteria associated with gestures. Preferably, gestures associated with a higher number of simultaneous touches have a higher recognition priority in gesture recognition hierarchy than those associated with a lower number of simultaneous touches. More particularly, if two touch points are associated with an e-book object, and multi-touch gestures are supported, the two touch points will be recognized together as a two-pointer gesture, and not as two different one-pointer gestures. Similarly, if four touch points are associated with an e-book object, and multi-touch gestures are supported, the four touch points will be recognized together as a four-pointer gesture.

When recognizing a gesture, the system detects the movement of each touch point on the touch surface as a movement vector V on the x-y plane. The movement vector V is composed of Vx and Vy components along the x- and y-axes, respectively, which are used for determining the gesture.

The system applies a distance threshold method to touch contacts. When a pointer (e.g., a finger) contacts the touch surface at a position that is not defined as a clickable hot spot (ie., a button), and then is moved, the system waits until the pointer has moved for a distance larger than a predefined threshold $T_1$ (e.g., 20 pixels) to respond. This distance threshold approach avoids screen image flicking due to the noise in touch detection and during multi-touch gesture recognition. For example, a user may apply a first finger on a page and then apply a second finger on the page to perform a zooming-out gesture. If the first finger only slightly moves before the second finger is applied, the distance threshold approach prevents the page from flipping, and therefore prevents undesirable page image flicking.

In a preferred embodiment, some gestures are defined based the crossing method, which was first disclosed as a gesture technique for moving an object in the U.S. patent application Ser. No. 12/423,726 entitled "Method for Selecting and Manipulating a Graphical Object in an Interactive Input System, and Interactive Input System Executing the Method" by Edward Tse et al., assigned to SMART Technologies ULC of Calgary, Alberta, the content of which is incorporated by reference. As will be described, the crossing method is modified in order to implement multi-pointer crossing, and is used for various purposes.

FIGS. 8A to 8C illustrate a multi-pointer crossing method. Referring to FIG. 8A, multiple pointers 602, 604 and 606 have each contacted the touch surface at a location that does not correspond to an object 600. As the pointers are moved upwards, the touch points move accordingly towards the object 600. When a first touch point 604 "hits" the border of the object 600 (i.e., at least a portion of the first touch point 604 overlaps the border of the object 600), as shown in FIG. 8B, the e-book reader application zeroes a timer and then triggers the timer to begin counting. When a second touch point 606 hits the border of the object 600, as shown in FIG. 8C, the timer is referred to for the time lapsed since the first touch point 604 hit the border of the object 600. If the time lapsed is less than a particular time threshold (e.g., 300 milliseconds), the application establishes that a two-pointer crossing gesture is being performed. The timer is then reset to zero and triggered to begin counting again. In the event that a third touch point 602 hits the border of object 600 within the particular time threshold, the application establishes that a three-pointer crossing gesture is being performed. The timer reset and counting occurs again as described above until such time as the particular time threshold is exceeded without an additional touch point having hit the border of the object 600. In this event, the system determines that an X-pointer crossing gesture is being performed (where X is the number of touch points that have crossed the object 600 in the manner described above). Preferably, in the event that more touch points have crossed the object 600 than are supported in a single gesture, the additional touch points are ignored.

It is preferable that the system track a distance threshold between touch points, so as to determine whether two touch points that are a threshold distance apart are suitably considered part of a single gesture.

FIG. 9 is a table setting out some gestures supported by the e-book reader application in order to manipulate an e-book object in various ways. The listed gestures are described below in connection with exemplary screenshots. It will be appreciated that the list in table 9 is not an exhaustive list of gestures or means of manipulating an e-book object.

Referring to FIGS. 9 and 10, a moving book gesture 630 is recognized when three or more touch points 702 are associated with an e-book object 700 and moved. The touch points 702 are considered associated with the e-book object 700 in the event that the touch points are associated with locations corresponding to the e-book object 700, such as on the areas of pages, page stacks, book spine and/or book front/back cover. With the three or more touch points 702 having been associated with the e-book object 700, the e-book object 700 is moved to a different position 704 on the e-book reader application desktop while the position and angle of each pointer relative to the geometrical center of the multiple pointers are not significantly changed (i.e., are within threshold relative distances and angles with respect to each other). In the event that the e-book reader application detects three or more pointers associated with the e-book object, the tilting and turning zones are automatically disabled. Thus, moving of the e-book object may be done by a user even if some or all of the touch points correspond to locations within the special zones.

The moving book gesture 630 may alternatively be triggered with an increase in pressure of a single pointer above a threshold level so as to enter a book moving mode whereby the book object 700 "sticks" to the pointer regardless of pressure and is moved with the pointer until such time as the threshold level of pressure is achieved once more or the pointer is lifted, to "unstick" the pointer from the book object 700.

The book object 700 may be moved onto the bookshelf as described above.

The rotating book gesture 632 is recognized when two or more touch points are associated with a book object (i.e., on the areas of pages, page stacks, book spine and/or book front/back cover) and the touch points move in a circular manner to change the angle of each pointer relative to the geometrical center of the multiple pointers. The e-book object is rotated in accordance with the average angle change of the touch points.

It will be understood that different types of gestures may be combined and performed at the same time. For example, three touch points may be associated with an e-book object and the e-book object moved and rotated simultaneously. Other gestures, such as resizing gestures, may be similarly combined.

The e-book reader application can be configured to flip a page 634 in response to performance of a particular gesture, and may be configured to do so in response to performance of one of a number of different gestures. FIGS. 11A and 11B illustrate a first page flipping gesture, where the user may bring a pointer 722 into contact with the touch panel at a location corresponding to a page 720, but not within any of the special zones referred to above thereby to associate a touch point with the page 720. By moving the pointer and accordingly the touch point generally towards the inner edge 728 adjacent to the book spine, the user executes a translation gesture. More particularly, page flipping begins when the distance the touch point has moved along the x-axis, i.e., the absolute value of the Vx component, exceeds a predefined threshold $T_2$.

In this embodiment, the page 720 is animated to illustrate the page-flipping effect, rather than simply immediately replaced with a view of the previous or next page. The nature of the page-flipping animation is based on the paper solidness and paper thickness properties, and also on the starting position of the touch point and gesture. The nature of the page-flipping animation is also preferably based on the distance the touch point is moved along the y-axis, just as though the pointer was actually stuck to the page and pulled it in both the x- and y-directions.

As shown in FIG. 11B, where the paper solidness is set to "solid" and the paper thickness is set to a value corresponding to "magazine paper", the image of the page being flipped 720 is perspectively stretched but continues to appear "flat" during flipping so it is animated like a rigid magazine page. However, in FIG. 11C, a pointer 742 is making contact with the touch surface at the center of a page 740 to flip the page, where the paper solidness of the page is set to "soft" and the paper thickness is set to a value corresponding to "regular book paper". In accordance with the attributes, the image of the page being flipped is perspectively stretched and curved to provide the appearance of flipping a regular, soft paper.

Referring to FIG. 11D, when the initial location of the touch point 762 is closer to a corner of a "soft" page 760 (not in a special zone, however), the page-flipping is animated starting from that corner. Referring to FIG. 11E, the pointer 782 is touching near the outer edge of a page 780 to flip the page. Accordingly, the page-flipping is animated such that the outer edge is flipped first. In FIG. 11E, there is no special zone at the outer edge for tilting the e-book object.

FIG. 11F shows a second page flipping gesture using a crossing method as described above. One or more pointers 802 are placed outside of the e-book object 800 on the e-book reader desktop, and are caused to moving towards the e-book object 800. A crossing event is generated after at least one of the fingers crosses the outer edge 804 of the page stack 806 (or the outer edge of the page if the page stack is invisible, which is true when at most one page is left on the side of the page stack) for a distance larger than a predefined threshold $T_2$. The topmost page 802 is then flipped, and the e-book reader application animates the page-flipping 808 while the touch point(s) are moved to a new position 810.

The same or similar flipping page gestures may also be used in connection with the front and/or back covers of an e-book object, with an additional requirement that the direction of Vx is towards the inner edge.

In above examples, the content on all visible areas of the e-book object during page flipping is visible to the user so that the user may browse the content while flipping a page. Animation is used to enhance the page flipping effect. Once the touch points have been moved a distance that is more than half of the page width along the x-axis towards the inner edge (i.e., $|Vx|>D/2$, where D is the page width), the page flipping is completed automatically by the e-book reader application without further touch point movement being required. After a page is flipped, the page stacks on the left and right sides of the book, respectively, are modified to indicate the number of pages on each side.

Figure 12:
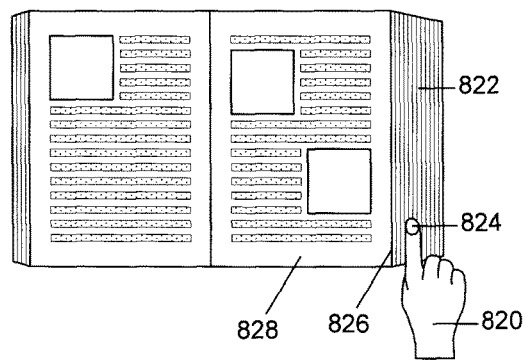
FIG. 12 illustrate the jumping to page gesture.

FIG. 12 illustrates a jumping to page gesture 636, as listed in the table of FIG. 9. A pointer 820 contacts the touch surface at a location 824 within the page stack 822 of the e-book object. The e-book reader application determines the center of the touch point thereby to establish the location 824, and calculates a distance $D_T$ from the location 824 to the inner edge 826 of the page stack 822, which is defined as the outer edge of the current page 828 (ie. the page on the top of the page stack 822). Distance $D_T$ is compared to the width W of the page stack 822, and a page number PG is calculated according to Equation 1, below:

$$PG=PG_0+D_T/W*N_P \quad (1)$$

where:

$PG_0$ is the page number of the current page 828; and $N_P$ is the number of pages in the page stack 822.

PG is the page number that the touch point is resolved to have coincided with. With PG having been calculated, the e-book reader application jumps to page PG such that page PG is displayed at the top of its respective stack 822. In this way, the e-book appears to have been opened at page PG.

While the above method enables a user to jump to particular pages in an e-book with a useful degree of granularity, it will be appreciated that alternative methods of calculating an approximate PG may be employed. For example, PG may alternatively be resolved as the first page of a chapter that is closest to the determined touch point, in a similar manner to a bookmark.

Gestures for turning the e-book object, as listed in the table of FIG. 9 as item 640 will be described in the following examples. Turning to FIGS. 13A to 13E, there is illustrated an exemplary scenario of such e-book object manipulation that begins with the pointer contacting the touch surface at a touch point location that coincides with the e-book object (and that is outside the book-tilting zone), and continues with moving of the touch point.

Figure 13A:
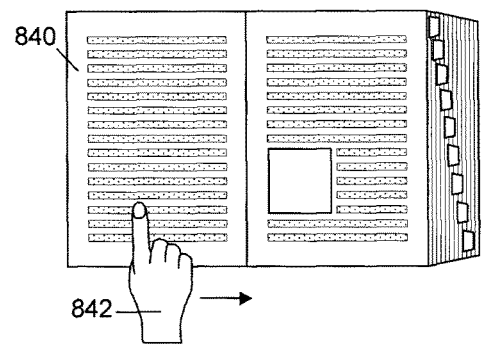
FIGS. 13A to 13E illustrate an exemplary scenario of e-book object manipulation by using the turning book and flipping a page gestures.
Figure 13B:
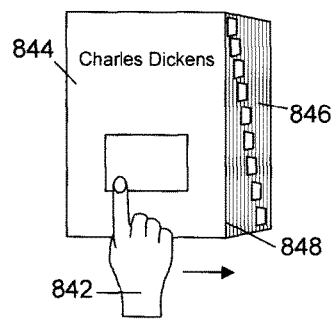

More particularly, in FIG. 13A, there is shown an e-book object with a single page 840 in the page stack on the left side. A pointer 842 is detected making contact with the touch screen at the location corresponding to the single page 840, and is detected moving to the right. In response, the e-book reader application flips the page 840 over to the right stack. As shown in FIG. 13B, since the page 840 has been fully flipped to the right stack, and was the only page in the page stack on the left side, the front cover 844 is made visible, and the e-book object is then displayed in its front-cover state. In the front-cover state, the e-book object is also scaled to its maximum permissible size.

Preferably, in order to provide a smooth manipulation experience, in this embodiment the e-book object image is also made to automatically slide with animation a small distance to arrive at a position whereby the pointer's position relative to the cover is the same as the pointer's position had been relative to the page 840 before the pointer 842 had been moved. In an alternative embodiment, in which a book-turning zone is defined on the cover, the e-book object image is relocated so that the book-turning zone of the front cover 844 is at a position coinciding with the location of the pointer contact.

Figure 13C:
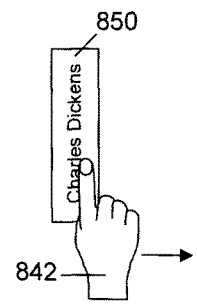

While not evident in FIG. 13B, because it contains no pages, the page stack at the left-hand side has been set to a width of zero and is accordingly invisible. That is, all pages of the e-book object are now allocated to the right-hand side page stack 846. However, should the pointer continue to be moved along the front cover 844 of the e-book object towards the outer edge 848, the e-book reader application will interpret the gesture as a turning book gesture 640 (see FIG. 9) once the Vx component of the pointer movement becomes larger than a predefined threshold $T_2$. Once the Vx component of the pointer movement becomes larger than this threshold, the e-book object is then turned as the pointer continues to move, until it reaches a maximum-size book spine state. In the maximum-size book spine state, the e-book object is scaled to its maximum size and just the spine of the book is made visible, as shown in FIG. 13C. In this embodiment, the maximum-size book spine state is reached when the absolute value of Vx exceeds a predefined threshold $T_3$, which is half of the width of the cover. Other threshold values may be employed to achieve a similar effect.

As shown in FIG. 13C, the book spine image 850 is displayed at a position that corresponds to the position of the pointer. Overlying the book spine image, or as part of the book spine image, the book name or other identifying information is displayed. Should the pointer 842 continue to be moved, the entire area of the book spine image is considered a book-turning zone, and the e-book object continues to be turned until it reaches a minimum-size back cover state, in which the back cover of the e-book object image is shown in its minimum size, as shown in FIG. 13D.

Figure 13D:
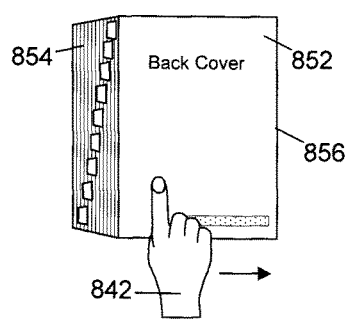
Figure 13E:
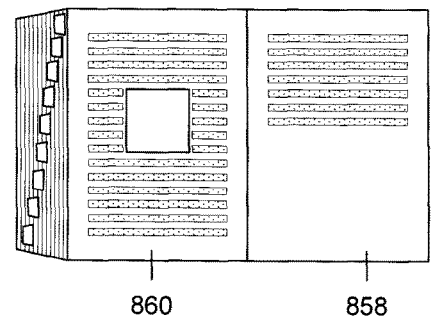

As is also shown in FIG. 13D, once the e-book object image is in the minimum-size back cover state, the page stack 854 at the left-hand side now contains all pages, and the page stack at the right-hand side contains no pages and is therefore invisible. Should the pointer continue to move along the touch screen towards the inner edge 856 of the back cover 852, the gesture is automatically recognized by the e-book reader application as a page flipping gesture. Thus, as shown in FIG. 13E, the e-book object image progresses from the minimum-size back cover state to a minimum-size opened book state, in which the last page 858 is moved from the left-hand stack to the right-hand stack such that the last two pages 858 and 860 are displayed.

In the above-described manner, a single type gesture on the e-book object can, based on the state of the e-book object it brings about, continue to be used to bring the e-book object into other progressive states. That is, the e-book object can be closed, turned to its spine, turned from its spine to its back cover state and opened from the back cover again, all with a single type of gesture continuously applied. It will be appreciated that the reverse order of states can be brought about with a gesture in the opposite direction.

Advantageously, while an e-book object is in its front cover state (see FIG. 13B), book spine state (see FIG. 13C) or back cover state (see FIG. 13D), a 1-pointer or multi-pointer crossing at the left or right edge is also interpreted by the e-book reader application as a turning book gesture.

Referring again to FIG. 9 again, two or more pointers moving apart from each other ("moving-apart") 644 may be recognized as a zooming-in or turning book gesture, depending on the state and the size of the book. Similarly, two or more pointers moving towards each other ("moving-towards") 646 may be recognized as a zooming-out or turning book gesture, again depending on the state and the size of the book.

Figure 14:
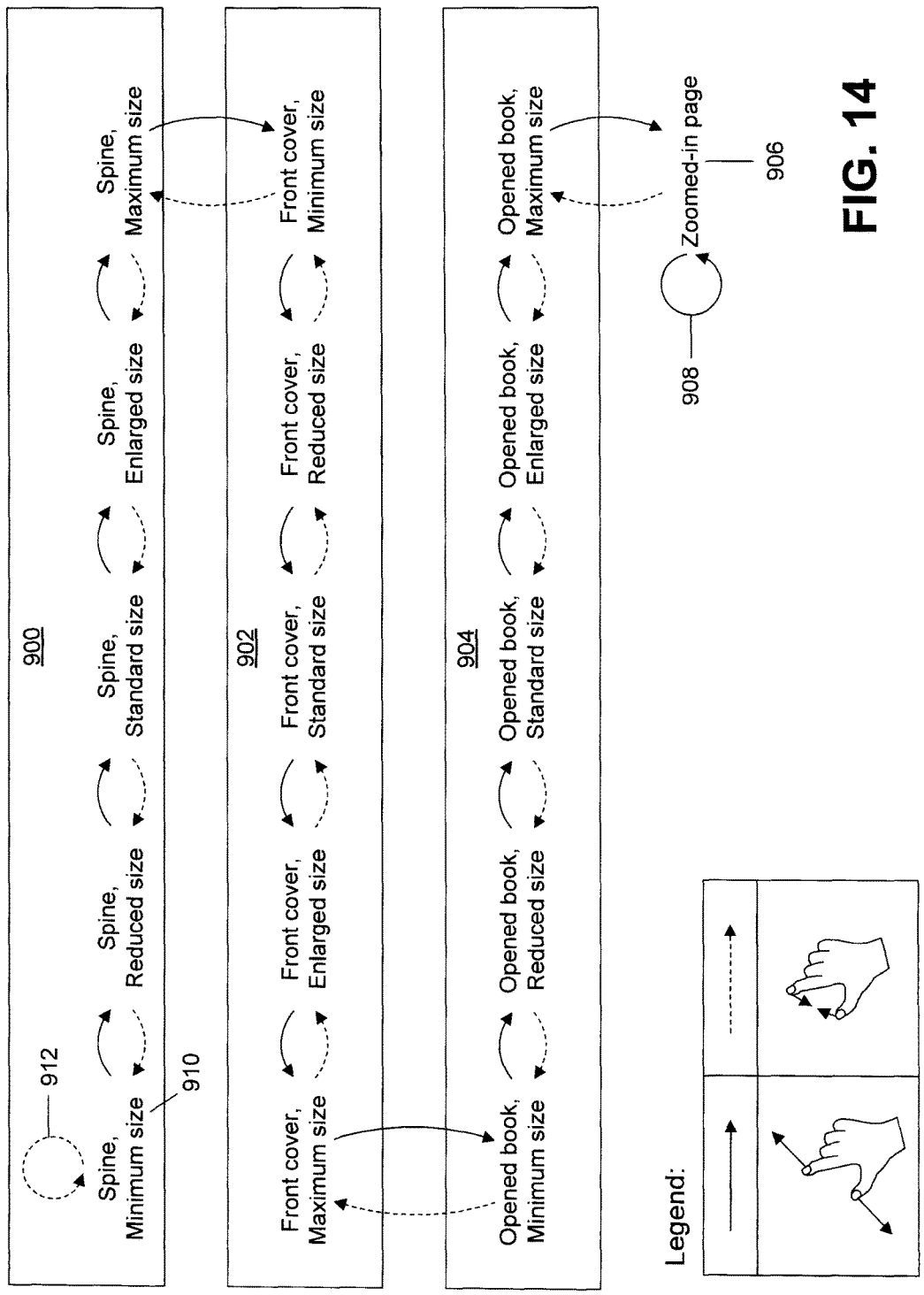
FIG. 14 shows the state diagram of an e-book object manipulated by the moving-apart and moving-towards actions.

FIG. 14 is state diagram of an e-book object during manipulation by the moving-apart and moving-towards gestures. Each of the book spine state 900, front cover state 902 and the opened book state 904 comprises a plurality of sub-states corresponding to different e-book object sizes in each state. Within each state, moving-apart and moving-towards actions are interpreted by the e-book reader application as zooming-in and zooming-out gestures, respectively, and are used to transfer the book from one sub-state to another. When the e-book object is transferred from the book spine state 900 to the front cover state 902, or vice versa, the moving-apart and moving-towards actions are recognized as turning book gestures. When the e-book object is transferred from the front cover state 902 to the opened book state 904, or vice versa, the moving-apart and moving-towards actions are recognized as flipping a page gestures. When the e-book object is transferred from the opened book state 904 to the zoomed-in page state 906, or vice versa, the moving-apart and moving-towards actions are recognized as zooming-in and zooming-out gestures, respectively.

Figure 15:
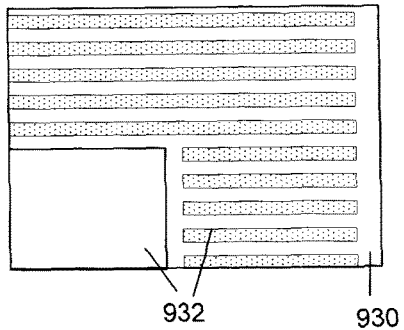
FIG. 15 shows an exemplary e-book object in the zoomed-in page state.

FIG. 15 is a depiction of an e-book object 930 while in the zoomed-in page state. The e-book object may comprise a minimum, standard and maximum size for this state, and the e-book reader application also provides a set of default values for these sizes. When the e-book object is in the zoomed-in page state, only the particular page content 932 being zoomed into is shown. Also referring to FIG. 14, the zooming-in gesture can still be used to further zoom-in the page (step 908). When the book image reaches the maximum size for the zoomed-in page state, further applying the zooming-in gesture will not cause the e-book object image to itself be enlarged. However, the page content (i.e. the font or pictures) may still be zoomed to a predefined maximum zooming-in ratio.

Referring again to FIG. 14, when the e-book object is at the "book spine, minimum size" sub-state 910, further applying the zooming-out gesture (step 912) would have no effect on the e-book object, such that the e-book object will continue to stay at the "book spine, minimum size" sub-state 910.

It was shown in the publication entitled "E-conic: a Perspective-Aware Interface for Multi-Display Environments," by Nacenta et al. published in Proceedings of the Conference on User Interface Software and Technology (UIST'07), 279-288, that a user's reading speed is significantly improved when the perspective of the text being read is corrected for the users eye position. To facilitate this improvement, a multi-finger crossing gesture is recognized by the e-book reader application, which in response tilts the e-book object to improve the user's reading experience. In particular, the book object can be rotated with respect to the x-axis within a range of predefined angles.

As shown in FIG. 9, touching a pointer in the book-tilting zone and moving generally vertically (i.e., |Vy|>$T_2$, where $T_2$ is a predefined threshold) will cause the book to be tilted within the predefined range of angles. In this embodiment, one-pointer or multiple pointers crossing the top or bottom edge of the e-book object will also cause the book to be tilted within the predefined range of angles.

Figure 16:
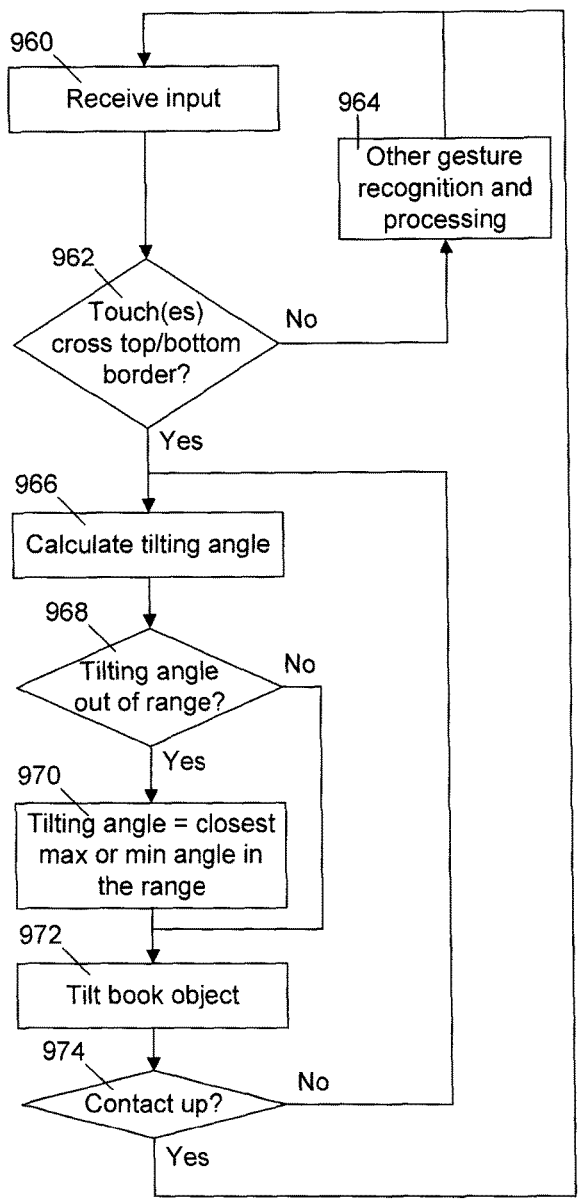
FIG. 16 illustrates the flowchart of using the crossing method for tilting the e-book object.

FIG. 16 is flowchart showing the crossing method for tilting the e-book object as referred to above. When the e-book reader application receives user input (step 960), it is determined whether one or more pointer contacts have crossed the top/bottom border of the e-book object (step 962). If not, the process goes to step 964 to determine whether the user input can be interpreted as another gesture or gestures, and then returns to step 960 to await further user input. If it is determined that one or more pointer contacts have crossed the top/bottom border of the e-book object, the system calculates a tilting angle based on the distance the pointer contact has moved (or average distance multiple pointers have moved) since reaching the border (step 966). More particularly, the e-book reader application considers the position of the border as the starting line position, and then calculates the average distance between those contacts that have crossed the border, and the starting line position. The e-book reader application then calculates the tilting angle in proportion to the average distance, within the range. To prevent the user tilting the book to an angle difficult for reading, a range of tilting angles [$\phi_1$, $\phi_2$] is limited. That is, the actual tilting angle $\theta_0$, must be $\phi_1 \leq \theta_c \leq \phi_2$. At step 968, if the calculated tilting angle $\theta_0$ is out of this range, it will be converted to the closest maximum or minimum angle in the range (step 970), as shown in Equation 2, below:

$$\begin{cases} \theta_c = \varphi_1, & \text{if } \theta_0 < \varphi_1; \\ \theta_c = \varphi_2, & \text{if } \theta_0 > \varphi_2; \\ \theta_c = \theta_0, & \text{otherwise} \end{cases} \quad (2)$$

After the actual tilting angle $\theta_c$ is calculated, the e-book reader application then automatically tilts the book object to the angle $\theta_c$ (step 972). The e-book object image, as well as the visible book content, is accordingly perspectively modified. At step 536, the e-book reader application detects whether any contact-up events are generated from these contacts (i.e., some fingers are lifted from the touch screen). If contact-up events are not detected, the process returns to step 966 in order to update the tilting angle if requested. Otherwise, the book tilting is completed and the process returns to step 960.

Figure 17A:
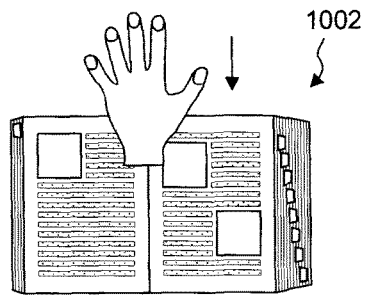
FIGS. 17A and 17B shows an exemplary tilting book gesture.
Figure 17B:
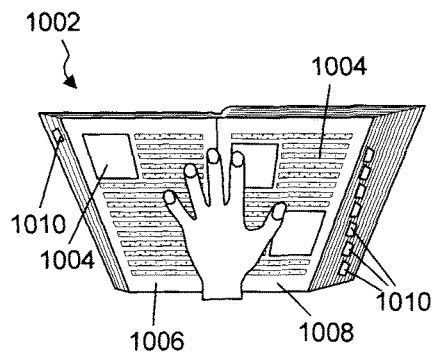

FIG. 17A depicts an e-book object 1002 being tilted in response to a five-pointer crossing of the e-book object 1002 and continued movement of the pointers downwards. As shown in FIG. 11B, the e-book object 1002, the content 1004 on the visible pages 1006 and 1008 of the e-book object 1002, and the bookmarks 1010 have been perspectively stretched a degree in accordance with the tilting angle.

Figure 18:
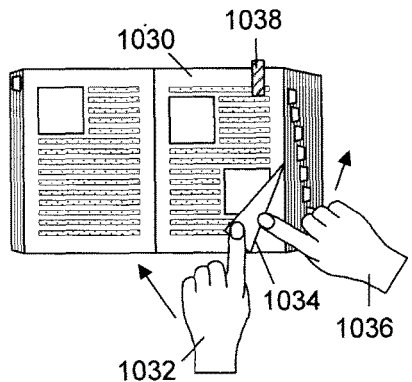
FIG. 18 shows an example of creating a bookmark on a page by using a two-step gesture.

FIG. 18 shows an example of creating a bookmark on a page 1030 by using a two-step gesture. First, the e-book reader application detects a touch point from a pointer 1032 at a position corresponding to a corner at the outer edge of the page 1030, and the dragging of the touch point towards the diagonally opposite corner of the page. The e-book reader application then detects an additional touch point from an additional pointer 1036 being moved generally along the folding crease 1034 that is displayed when the corresponding page of the e-book object is being turned. After at least one of the first and the second pointers is lifted, a user bookmark is automatically created and added to the e-book object. A user bookmark icon 1038 is also applied to the page 1030. As a result, a user can create a bookmark in a closely analogous manner to the way people fold pages of a physical book to mark their last-read, or a favourite, page.

Referring again to FIGS. 6A and 6B, the book search function (processed at step 482 in FIG. 7) will now be described.

The book search user interface (UI) is integrated with the book shelf UI 420, comprising a text input box 428, a "clear" button 430 and an on-screen keyboard 432. As described above, the book shelf and book search UI may be a 2D graphic as shown in FIG. 6A, or a 3D graphic as shown in FIG. 6B. In some embodiments, the on-screen keyboard 432 is always shown on the display. However, those skilled in the art will appreciate that the on-screen keyboard 432 may be shown only when the input focus is in the text input box 428.

In some embodiments, the e-book reader application or related application is configured to connect to the Google™ Books website offered by Google, and can be employed to search among the public domain books available through Google™ Books. In some other embodiments, the system may also search copyrighted books in the user designated resources after a user account in the designated resource is provided.

To search a book, the user touches the text input box 428 and then enters the search keywords by using the on-screen keyboard 432. The user may touch the "clear" button 430 to erase all the text in the text input box 428, and can enter new keywords. The search is deployed after the user touches the "OK" button 433.

Figure 19:
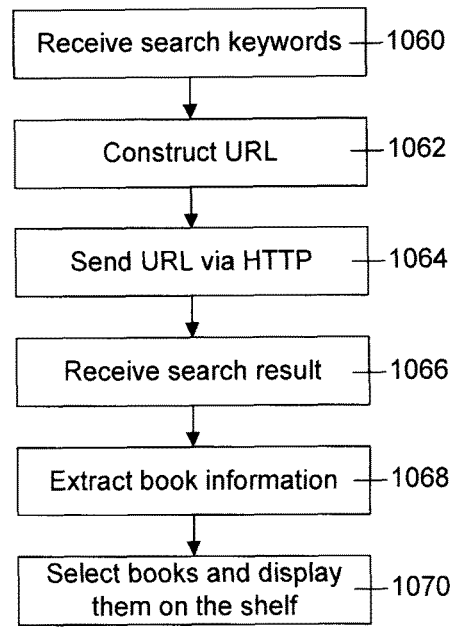
FIG. 19 illustrates the flowchart of searching books in the online resource.

FIG. 19 is a flowchart showing a process of searching books in the online resource, e.g., Google™ Books. At step 1060, the system receives the keywords the user has entered. Then, the system constructs a URL (Uniform Resource Locator) with a query, or argument, that comprises the keywords (step 1062). For example, a URL with a query comprising the keyword "Shakespeare" may be: "http://books.google.com/books?q=shakespeare&btnG=Search%20Books&rview=1"

The URL is sent to the Internet via HTTP (Hyper Text Transfer Protocol) at step 1064. For the above exemplary URL, the host books.google.com receives the HTTP request, and sends back the search result in the form of an XML- (eXtensible Markup Language) formatted result set (which could be empty should the search return no hits). The e-book reader application receives the result set (step 1066), and extracts any book information from the result set, and organizes the extracted information to book information records (step 1068), where each record corresponds to the information of a book in the search result. Each record comprises, for example, a book name, a book overview (abstract), a number of pages, preview images, and other relevant information. A book list is then generated for the book shelf 420.

At step 1070, the e-book reader application selects several book records in accordance with predefined rules. Such rules may specify simply to select the first eight records, or the eight highest-rated books, and so forth. The selected books are then displayed in the book shelf 420 with some brief information (e.g., the book names) shown (see the book 434 in FIG. 6A). Typically, these books are shown in the book shelf 420 as book spines with equal height (see FIG. 6A). However, when the book dimension information is provided in the search result set, the books are shown in the book shelf 420 as books spines with height proportional to the obtained book height information (see FIG. 6B), in order to strengthen the bookshelf metaphor.

Referring again to FIGS. 6A and 6B, when the e-book reader application detects a scroll command such as for example, clicking the scroll button 424 or 426, or a multi-pointer scrolling gesture, the system scrolls the book list of the book shelf 420 to show other books. Here, the multi-pointer scrolling gesture is defined as multiple fingers contacting the book shelf and moving to the left (scrolling to the left) or right (scrolling to the right) (see 648 in FIG. 9).

As described before, the e-book reader application loads an e-book object (e.g., the book 434) once gestures are received that are interpreted to pull the e-book object from the book shelf 420 by dragging or by using the crossing method (see 650 in FIG. 9).

In some embodiments, if the e-book object to be loaded has been cached for the e-book reader application, it will be loaded from the cache. Otherwise, the e-book object will be downloaded from its source, and then converted from its original format (e.g., pdf, tiff, jpg or gif) to a series of PNG images, where each image corresponds to a page. During the format conversion, preferably the white margin of the image of each page is automatically detected and removed.

The e-book reader application preferably provides other tools together with support of other gestures for performing additional functions.

Figure 20:
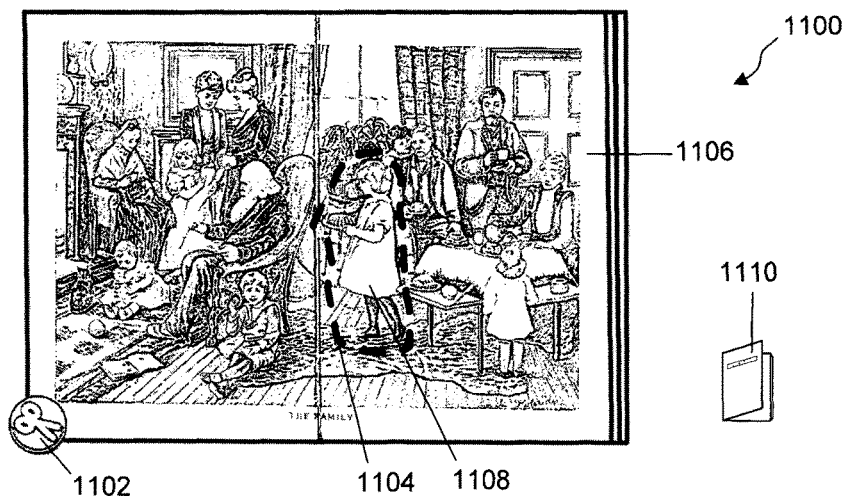
FIG. 20 illustrates the cropping page gesture.

For example, referring to FIG. 20, which shows an e-book object 1100, a user can invoke a cropping tool 1102 to activate a lasso tool to make a selection 1104 on a page 1106 of the e-book object 1100. An image object 1108 is then created, at the position of the lasso selection 1104, which comprises the image encompassed by the lasso selection 1104. The new image object 1108 is associated with the page 1106. Because the new image object 1108 is on top of the page 1106, actions performed by the pointer contacts within the image object 1108 are recognized as gestures applied thereto. Also because the image object 1108 is associated with the page 1106, when the page 1106 or the e-book object 1110 is manipulated by gestures applied thereon (e.g., moving, rotating, zooming-in/out, etc.), the image object 1108 is also manipulated accordingly as if it was still an integrated part of the page 1106. For example, if the page 1106 is flipped to the other stack, the image object 1108 is also flipped accordingly, and becomes invisible as though it were covered by the page 1106. Accordingly, if another flipping page gesture is performed to flip the page 1106 back, the image object 1108 is also flipped back. The user may perform a multi-pointer moving gesture on the image object 1108 to move the image object 1108 to a scrapbook icon 1110. A copy of the image object 1108 is then placed into a scrapbook as though it were cut-out of the e-book object page by scissors. In some embodiments, the image object 1108 persists until a new image object is created by making a new lasso selection. In some alternative embodiments, the image object 1108 exists until a "clear selection" button (not shown) is tapped, which allows the user to create multiple coexisting image objects by performing multiple lasso selections.

It will be understood that the above description provides numerous descriptions of various functions that are illustrative, but that are not intended to be interpreted so as to limit the invention described herein to just the embodiments described.

Figure 21:
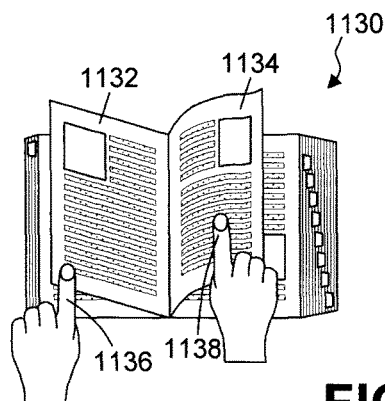
FIG. 21 shows an e-book object in which each page has different settings, and in which two pages are flipped at the same time.

For example, in an alternative embodiment, pointer contacts applied to an e-book object are automatically grouped based on their distance and/or their historical information. Gestures are then recognized based on groups of pointer contacts. FIG. 21 shows an exemplary book object 1130, in which each page has different settings. A user is simultaneously flipping two pages 1132 and 1134 using two fingers 1136 and 1138, respectively, where the page 1132 is a solid page, and the page 1134 is a soft page. Although the e-book reader application does allow pages to be flipped to different sides of the book at the same time, flipping two pages 1132 and 1134 at the same time may allow the user to preview the content hidden under the pages 1132 and 1134.

Although in above description, the pages of an e-book reader object are flipped horizontally between the left and right sides, those skilled in the art will appreciate that some books may be configured so that their pages may be flipped vertically. Also, although in the above description, a book is turned by the crossing-based turning book gestures, those skilled in the art will appreciate that, book-turning zones may be defined on book pages, book covers and/or book spine so that the user may apply a pointer in the book-turning zone and moving to turn the book.

Those skilled in the art will also appreciate that, in some alternative embodiments, the standard sizes of a book in the opened book, front/back cover and book spine states may have the same height (i.e., the book image length along the y-axis if the book is flipped along the x-axis, or the book image length along the x-axis if the book is flipped along the y-axis), and the multi-pointer moving-apart/moving-towards actions, when recognized as turning book or flipping a page gestures, will always cause the book to transfer from one state to the other state without deviating from the standard size.

In an alternative embodiment, only one book-tilting zone 292 or 294 overlies each page 286, 288.

The embodiments described above are only exemplary. Those skilled in the art will appreciate that the same or very similar techniques can also be applied to other collaborative interaction applications and systems, such as, direct touch systems that use graphical manipulation for multiple people, such as, touch tabletop, touch wall, kiosk, tablet, interactive whiteboard, etc, and systems employing distant pointing techniques, such as, laser pointers, IR remote, etc.

Also, although some of the embodiments described above, and particularly the embodiments of the e-book reader application that react to multiple pointer gestures, are intended for use with multi-touch interactive input systems, those of skill in the art will appreciate that many of the same techniques can also be applied using single-touch interactive input systems, and similarly enable a user to select and manipulate graphic objects related to an e-book, by using a single pointer.

Those of skill in the art will also appreciate that the same methods of manipulating e-book objects that have been described herein may also apply to different types of touch technologies such as surface-acoustic-wave (SAW), analog-resistive, electromagnetic, capacitive, IR-curtain, acoustic time-of-flight, or machine vision-based systems with imaging devices looking across the display surface. The same methods of manipulating e-book objects may alternatively or in some combination be directed with the use of a standard mouse and keyboard.

The interactive input system may comprise program modules including but not limited to routines, programs, object components, data structures etc. and may be embodied as computer readable program code stored on a computer readable medium. The computer readable medium is any data storage device that can store data, which can thereafter be read by a computer system. Examples of computer readable media include for example read-only memory, random-access memory, flash memory, CD-ROMs, magnetic tape, optical data storage devices and other storage media. The computer readable program code can also be distributed over a network including coupled computer systems so that the computer readable program code is stored and executed in a distributed fashion or copied over a network for local execution.

Although embodiments have been described above with reference to the accompanying drawings, those of skill in the art will appreciate that variations and modifications may be made without departing from the spirit and scope thereof as defined by the appended claims.

What is claimed is:

1. An interactive input system comprising:
   a touch panel; and
   a processing structure configured to:
      display on the touch panel at least one graphic object depicting a book having one or more page stacks, the processing structure displaying each page stack of the book graphic object with a respective width that is based on a number of pages in the page stack;
      in response to a first input gesture, received by detecting a first touch to a surface of the touch panel on a corner of a displayed page of one of the page stacks, animate the touch panel to show movement of a portion of the displayed page;
      in response to a second input gesture, received by detecting a second touch to the surface of the touch panel along a visual representation of a folding crease created by the animated movement of the portion of the displayed page, create a bookmark corresponding to the displayed page; and
      in response to a third input gesture less than a threshold distance from the first input gesture, received by detecting a third touch to the surface of the touch panel, determine a movement vector from a location of the first input gesture to a location of the third input gesture.

2. The interactive input system of claim 1, wherein the processing structure is further configured to, in response to a touch input, associate one or more pages in a page stack with a different page stack, and update the respective widths of at least one of the page stacks.

3. The interactive input system of claim 1, wherein the processing structure is further configured to receive a touch input, from the touch panel in association with a page stack and manipulate the book graphic object to display a selected book page in the stack in accordance with the location of the touch input.

4. The interactive input system of claim 3, wherein, in response to the touch input, the processing structure is further configured to automatically associate with a different page stack those book pages that are higher than the selected book page in its book stack, and updates the respective widths of at least one of the page stacks.

5. The interactive input system of claim 1, wherein the width of a page stack is also based on one or more attributes of the pages in the page stack.

6. The interactive input system of claim 5, wherein the one or more attributes include page thickness.

7. The interactive input system of claim 1,
   wherein the at least one book graphic object is displayed on a background, and the processing structure is further configured to track one or more touch points associated with the background, and
   wherein, in the event that one or more touch points coincide with a page stack of the book graphic object, the processing structure is further configured to associate a top book page in the page stack with a different page stack and display the next book page in the page stack.

8. The interactive input system of claim 1, wherein the processing structure is further configured to, in response to a touch input, cause the book graphic object to be tilted with respect to a display surface of the touch panel.

9. The interactive input system of claim 8, wherein causing the book graphic object to be tilted comprises rotating the book graphic object about an axis that is parallel to the display surface.

10. The interactive input system of claim 9, wherein the rotating is confined to a range of angles.

11. The interactive input system of claim 1, wherein each book graphic object has a respective dimension attributes, and wherein the processing structure is further configured to display each book object according to its dimension attributes.

12. The interactive input system of claim 1, wherein the processing structure is further configured to animate the one or more pages in a page stack in accordance with respective book page attributes.

13. The interactive input system of claim 12, wherein the book page attributes are one or more of at least: a book page material attribute or a book page dimension attribute.

14. The interactive input system of claim 1, wherein the processing structure is further configured to manipulate the book graphic object in accordance with a touch input by zooming in or zooming out, thereby increasing or decreasing the size of the book graphic object.

15. The interactive input system of claim 1, wherein the processing structure is further configured to manipulate the book graphic object in accordance with a touch input, wherein the effect of the manipulation for the touch input is based on a location relative to the book graphic object that the touch input is received.

16. The interactive input system of claim 1, wherein the processing structure is further configured to automatically remove regions of white space from a displayed page.

17. The interactive input system of claim 1, wherein the processing structure is further configured to:
   create another bookmark for one of the pages in one of the page stacks each time the first and second input gestures are performed on the touch panel; and
   display on the touch panel a bookmark icon associated with each bookmark such that each bookmark icon is readily accessible to a user regardless of what page is displayed on the touch panel.

18. The interactive input system of claim 1,
   wherein the bookmark corresponding to the displayed page is one of multiple bookmarks identified for different pages in a selected stack of the one or more page stacks;
   wherein each of the multiple bookmarks is displayed at a position corresponding to a portion of the width of the selected stack; and
   wherein each portion of the width of the selected stack for each of the multiple bookmarks is based on a number of pages in the selected stack below the page that bookmark corresponds to.

19. The interactive input system of claim 6,
   wherein the page thickness attribute corresponds to a type identified for a physical object containing text identified for the book graphic object; and
   wherein at least a first of multiple page thickness attributes, corresponding to a first type of identified physical object containing text, affects the width of page stacks differently than a second of the multiple page thickness attributes corresponding to a second type of identified physical object containing text.

20. The method of claim 1, further comprising:
animating the touch panel to show movement of the portion of the display page along the movement vector.

21. A method for manipulating a book graphic object displayed on an interactive input system, the method comprising:
tracking one or more touch points, on a touch panel of the interactive input system, associated with the book graphic object;
displaying the book graphic object on the touch panel, the book graphic object having one or more page stacks;
updating the respective widths of at least one of the page stacks based on the numbers of pages in the page stacks;
in response to a first input gesture, identified based on the tracked one or more touch points received by detecting a first touch to a surface of the touch panel on a displayed page of one of the page stacks, animating the touch panel to show movement of a portion of the displayed page;
in response to a second input gesture, identified based on the tracked one or more touch points received by detecting a second touch to the surface of the touch panel along a visual representation of a folding crease created by the animating the portion of the displayed page, creating a bookmark corresponding of the displayed page; and
in response to a third input gesture less than a threshold distance from the first input gesture, received by detecting a third touch to the surface of the touch panel, determine a movement vector from a location of the first input gesture to a location of the third input gesture.

22. The method of claim 21, further comprising:
creating another bookmark for one of the pages in one of the page stacks each time the first and second input gestures are received by the interactive input system; and
displaying on the interactive input system a bookmark icon associated with each bookmark such that each bookmark icon is readily accessible to a user regardless of what page is displayed on the interactive input system.

23. A non-transitory computer readable medium having stored thereon instructions that, when executed by a computing system, cause the computing system to perform operations for manipulating a book graphic object displayed on an interactive input system, the operations comprising:
tracking one or more touch points, on a touch panel of the interactive input system, associated with the book graphic object;
displaying the book graphic object on the touch panel, the book graphic object having one or more page stacks;
updating the respective widths of at least one of the page stacks based on numbers of pages in the page stacks;
in response to a first input gesture, identified based on the tracked one or more touch points received by detecting a first touch to a surface of the touch panel on a displayed page of one of the page stacks, animating the touch panel to show movement of a portion of the displayed; and
in response to a second input gesture, identified based on the tracked one or more touch points received by detecting a second touch to the surface of the touch panel along a visual representation of a folding crease created by the animating the portion of the displayed page, creating a bookmark corresponding to the displayed page; and
in response to a third input gesture less than a threshold distance from the first input gesture, received by detecting a third touch to the surface of the touch panel, determine a movement vector from a location of the first input gesture to a location of the third input gesture.

24. The non-transitory computer readable medium of claim 23, wherein the operations further comprise:
creating another bookmark for one of the pages in one of the page stacks each time the first and second input gestures are received by the interactive input system; and
displaying on the interactive input system a bookmark icon associated with each bookmark such that each bookmark icon is readily accessible to a user regardless of what page is displayed on the interactive input system.

* * * * *